United States Patent
Backhaus-Ricoult et al.

(10) Patent No.: US 7,960,009 B2
(45) Date of Patent: Jun. 14, 2011

(54) DISPERSION-TOUGHENED CORDIERITE FOR FILTER AND SUBSTRATE APPLICATIONS

(75) Inventors: Monika Backhaus-Ricoult, Horseheads, NY (US); Christopher Raymond Glose, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 776 days.

(21) Appl. No.: 12/072,948

(22) Filed: Feb. 29, 2008

(65) Prior Publication Data

US 2009/0220733 A1 Sep. 3, 2009

(51) Int. Cl.
B32B 3/12 (2006.01)
B32B 3/26 (2006.01)
B01D 39/06 (2006.01)
B28B 1/00 (2006.01)
C04B 35/64 (2006.01)

(52) U.S. Cl. ........ 428/116; 264/631; 264/681; 264/666; 55/523; 428/304.4

(58) Field of Classification Search .................. None
See application file for complete search history.

(56) References Cited

U.S. PATENT DOCUMENTS

| | | | |
|---|---|---|---|
| 6,391,813 B1 * | 5/2002 | Merkel | 501/119 |
| 6,645,649 B2 * | 11/2003 | Tanaka et al. | 428/697 |
| 6,753,277 B2 * | 6/2004 | Terashi | 501/32 |
| 7,465,687 B2 * | 12/2008 | Beall | 501/9 |
| 2005/0239640 A1 | 10/2005 | Nilsson et al. | |
| 2007/0281127 A1 * | 12/2007 | Backhaus-Ricoult et al. | 428/116 |
| 2008/0004171 A1 * | 1/2008 | Melscoet-Chauvel et al. | 501/119 |
| 2008/0032090 A1 * | 2/2008 | Beall et al. | 428/116 |
| 2008/0032091 A1 | 2/2008 | Beall et al. | |
| 2009/0137382 A1 * | 5/2009 | Merkel | 502/60 |
| 2009/0197265 A1 * | 8/2009 | Turner et al. | 435/6 |

(Continued)

FOREIGN PATENT DOCUMENTS

WO 2008/005291 A1 1/2008

(Continued)

OTHER PUBLICATIONS

Becher et al.; "Toughening Behavior in SiC-Whisker-Reinforced Alumina"; Communication of the American Ceramic Society; Dec. 1984; pp. C267-C269.

(Continued)

*Primary Examiner* — David R Sample
*Assistant Examiner* — Nicole T Gugliotta
(74) *Attorney, Agent, or Firm* — Walter M. Douglas

(57) ABSTRACT

A porous ceramic substrate includes a first phase of microcracked cordierite ceramic material and a second phase of non-cordierite metal oxide particles dispersed in the cordierite ceramic, wherein at least a portion of the interface between the first and second phases is wetted by glass and the particles of the second phase have a size in the range of from about 0.1 to about 10 μm. A method for toughening a porous microcracked cordierite ceramic includes the steps of providing a cordierite batch composition; adding to the cordierite batch composition at least one non-cordierite forming metal oxide or metal oxide precursor; mixing the batch composition with a pore former, binder, and water into a paste; shaping the paste into a green body; firing the green body; and annealing the fired green body at a temperature below the firing temperature to form a toughened cordierite ceramic honeycomb having a second phase of crystallized non-cordierite particles dispersed within the cordierite ceramic, wherein at least a portion of the interface between the first and second phases is wetted by glass.

20 Claims, 21 Drawing Sheets

U.S. PATENT DOCUMENTS

2009/0220734 A1 * 9/2009 Backhaus-Ricoult et al. .............. 428/116

FOREIGN PATENT DOCUMENTS

WO 2009/005679 A1 1/2009

OTHER PUBLICATIONS

Backhaus-Ricoult et al.; "Increase in Fracture Toughness of Monolithic Ceramics by a Partial Reduction Treatment"; Key Engineering Materials vols. 132-136 (1997) pp. 516-519.

Becher et al.; "Toughening Behavior in Ceramics and Cermets"; Key Engineering Materials vols. 161-163 (1999) pp. 285-290.

Xia et al,; "Review the Toughening and Strengthening of Ceramic Materials Through Discontinuous Reinforcement"; Journal of Materials Science 29 (1994) 5219-5231.

Orange et al.; "Preparation and Characterization of a Dispersion Toughened Ceramic for Thermomechanical Uses (ZTA). Part II: Thermomechanical Characterization. Effect of Microstructure and Temperature on Toughening Mechanisms"; Journal of European Ceramic Society 9 (1992) 177-185.

Noboru Miyata; "Toughening of Ceramics by Particle Dispersion"; J. Soc. Mat. Sci., Japan) vol. 43, No. 495, pp. 1634-1640, Dec. 1994. (No Translation).

* cited by examiner

A0-(1) as fired wall surface

A0-(1) polished wall section

DISPERSION-TOUGHENED CORDIERITE FOR FILTER AND SUBSTRATE APPLICATIONS

FIELD

This invention relates to highly porous cordierite-based ceramic articles for filter and substrate applications, such as honeycombs. Specifically, the invention relates to a process and batch composition for making dispersion-toughened cordierite honeycomb materials.

BACKGROUND

Cordierite and aluminum titanate-based substrates, typically in the form of a honeycomb body, have been used for a variety of applications, such as catalytic substrates and filters for diesel particulate emission control. In order to respond to increasingly stringent emission standards for light- and heavy-duty vehicles, the substrate materials must be highly porous to allow gas flow through the walls without restricting the engine power, and must show high particulate filtration efficiency, while inducing minimum pressure drop. Such substrates must also withstand the corroding environment and be able to withstand thermal shock during rapid heating and cooling. Cordierite has low thermal expansion and is therefore suited for applications where high thermal shock resistance is required. A cordierite crystal shows anisotropy in its thermal expansion with a negative coefficient of thermal expansion in its crystallographic c-axis and positive thermal expansion for its a-axis and b-axis, which creates a build up of local stresses in a polycrystalline cordierite material during thermal cycling. For sufficiently large grain or domain size, e.g., agglomerates of crystals with similar orientation, those stresses lead to microcracking during cooling. Several features in the microstructure contribute to the stress leading to microcracking in cordierite ceramics: texture, such as grain/domain size and local misorientation with the largest effect for misorientational tilt in the a/c crystallographic directions or the presence of second phase intergranular glass films or precipitates having different expansion. Microcrack network densities in commercially available as-processed cordierite honeycomb substrates extend over a wide range.

Microcracks form and open during cooling and close again during heating. During thermal cycling, microcracks cyclically form, open and close; and in the ideal case, the microstructure of the material does not evolve. In reality, however, many cordierite ceramics suffer changes in their microstructure with an increasing number of thermal cycles, particularly in their microcrack density. Thermal shock does not only induce reversible microcrack formation and opening, but can also lead to growth of existing microcracks. It becomes increasingly difficult to fully close large microcracks during heating, especially if the temperature is not high enough and the hold time at temperature is not long enough for healing the cracks, as usually experienced by a filter during operation in a car. Thus, growth of the microcrack network can occur during thermal cycling. Failure of the honeycomb parts during operation results from formation of macrocracks and their propagation through the part. For microcracked ceramics, such macrocracks most likely form from interconnection and growth of microcracks. Thus, durability during operation of a honeycomb substrate or filter repeatedly exposed to thermal cycling can be limited by the instability of the microcrack network during cycling; its extension will diminish the strain tolerance of the part and ultimately lead to fracture and failure of the part.

Microcracking not only helps to lower the thermal expansion of the cordierite ceramic, typically from $CTE=17\times10^{-7}$ $K^{-1}$ for non-microcracked porous cordierite to a range from 1 to $5\times10^{-7}$ $K^{-1}$, it also reduces the ceramic's strength. Initial thermal shock resistance of microcracked cordierite-based materials is often evaluated from the material's strain tolerance and its thermal expansion by using a factor TS, defined as $TS=500+\sigma/\text{E-mod}*CTE^{500°\ C.-900°\ C.}$ with $\sigma$ being the strength, E-mod the elastic or Young's modulus and $CTE^{500°\ C.-900°\ C.}$ the average thermal expansion coefficient from 500° C. to 900° C. The TS factor provides an indication of the thermal shock temperature in ° C., the honeycomb part is expected to withstand. For many cordierite honeycomb materials, this factor is between $TS=900°$ C. and $TS=1100°$ C., suggesting that filters made of those materials should withstand thermal shock up to about 900° C. to 1100° C. However, thermal cycling experiments of (bare) honeycomb parts do not always follow the prediction of the TS factor of the as-processed materials.

A material-dependant evolution of the microcrack density during thermal cycling or during filter operation on a car can occur. This evolution is strongly dependant on the ceramic material. Some materials do not show any significant evolution in their microcrack network density, others show a strong increase during extensive thermal cycling. A low initial microcrack density is not necessarily a guaranty of good longtime performance. A material with very low initial microcrack density and high initial strain tolerance can undergo during thermal cycling a strong degradation of its thermomechanical performance due to extended microcrack formation and growth, while a material with an initially rather high microcrack density may have a stable microcrack network and preserve its initial thermal shock resistance during severe cycling. These examples are meant to illustrate that a material's initial thermomechanical performance can degrade during thermal cycling and is not a sufficient indicator of long time performance under thermal cycling. For high durability of a filter during thermal cycling application, high fracture toughness of the material is needed. High fracture toughness restricts (or in the best case even inhibits) crack formation and propagation of the microcracks under thermomechanical stress, avoids fatal microcrack growth and helps to preserve the initial thermomechanical filter performance.

Although the stability of the microcrack network during thermal cycling is crucial for durability of ceramic filters and substrates in automotive exhaust applications, the focus on substrate and filter material development rarely centers on fracture toughness.

From a fundamental point of view, the particularities of the microcrack network in microcracked aluminum titanate-based and cordierite-based ceramics and the resulting limitations in fracture toughness during repeated thermal cycling of such ceramics have not been carefully addressed in the past and still lack specific material engineering approaches to overcome these limitations.

New products that will meet the key desired filter properties: high initial thermal shock resistance, high filtration efficiency and low pressure drop and offer in addition higher durability through an improvement in fracture toughness are desired and will enable preparation of products with higher thermal shock tolerance and improved lifetime.

The art lacks suitable dispersion-toughened microcracked ceramics having improved durability during thermal cycling. The present invention is directed to overcoming these and other deficiencies in the art.

SUMMARY

The invention relates to a dispersion-toughened porous ceramic cordierite honeycomb in which glass-wetted dispersed second phase particles interact with microcracks in the honeycomb and suppress their propagation into macroscopic cracks. As a result of the interaction between the microcracks and the dispersed second phase, the honeycomb preserves a rather stable microcrack density upon cycling, demonstrates higher fracture toughness and also improved durability in thermal cycling applications.

In particular, the product relates to a porous ceramic honeycomb including a first phase of microcracked cordierite and a second phase of crystalline non-cordierite metal oxide particles dispersed in the cordierite ceramic, wherein at least a portion of the interface between the first and second phases is wetted by glass and the second phase particles have a size in the range of from about 0.01 to about 10 μm.

The invention further relates to a method of making a dispersion-toughened honeycomb filter or substrate material by adding glass-forming elements to the batch, forming glassy pockets during firing, and partially or fully crystallizing those pockets into a second phase dispersion.

In particular, the method relates to toughening a porous microcracked cordierite honeycomb by providing a cordierite batch composition; adding to the cordierite batch composition at least one non-cordierite forming metal oxide or metal oxide precursor; mixing the batch composition with a pore former, binder, and water into a paste; shaping the paste into a green body; firing the green body; and annealing the fired green body at a temperature below the firing temperature to form a toughened cordierite ceramic honeycomb having a second phase of crystallized non-cordierite particles dispersed within the cordierite ceramic, wherein at least a portion of the interface between the first and second phases is wetted by glass.

BRIEF DESCRIPTION OF THE DRAWINGS

FIG. 1A is a set of schematic drawings showing a comparative microcracked ceramic with grains in different crystallographic orientation without any second phase particles;

FIG. 1B is a set of schematic drawings showing a comparative microcracked ceramic with grains of different orientation separated by a continuous glassy film that forms a continuous interconnected glass-film network;

FIG. 1C-*i* to FIG. 1C-*iii* is a set of schematic drawings depicting a single precipitate in the matrix of the primary phase and the interfacial area with a low elastic modulus glass film, FIG. 1C-*iv* is a set of schematic drawings depicting the response to stress of the dispersion-toughened microcracked ceramic;

FIG. 1D is a set of schematic drawings showing a microcracked ceramic of the invention toughened by a dispersion of microcracking precipitates;

FIG. 1E is a set of schematic drawings showing toughening of a microcracked ceramic of the invention by a dispersion of plastically deformable, soft precipitates;

FIG. 1F is a set of schematic drawings showing toughening of a microcracked ceramic of the invention by a dispersion of precipitates that undergo stress-induced phase transformation under volume increase;

DETAILED DESCRIPTION

Figure 1:
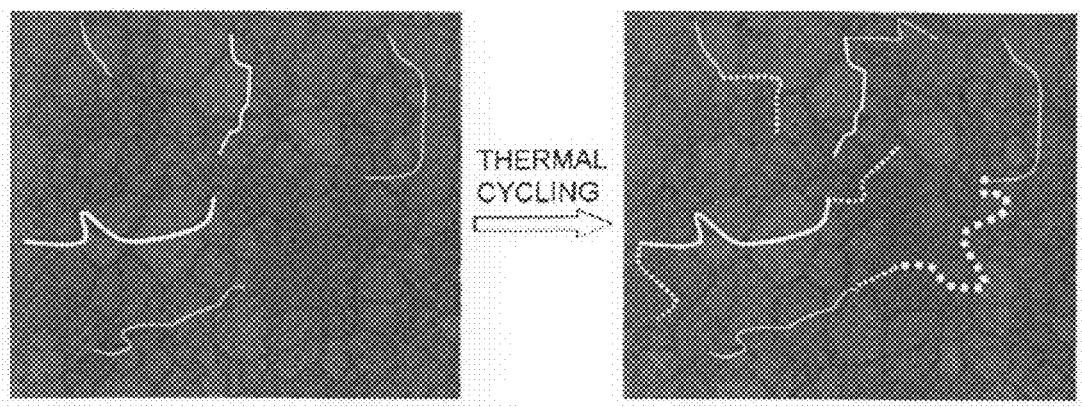
Figure 1:
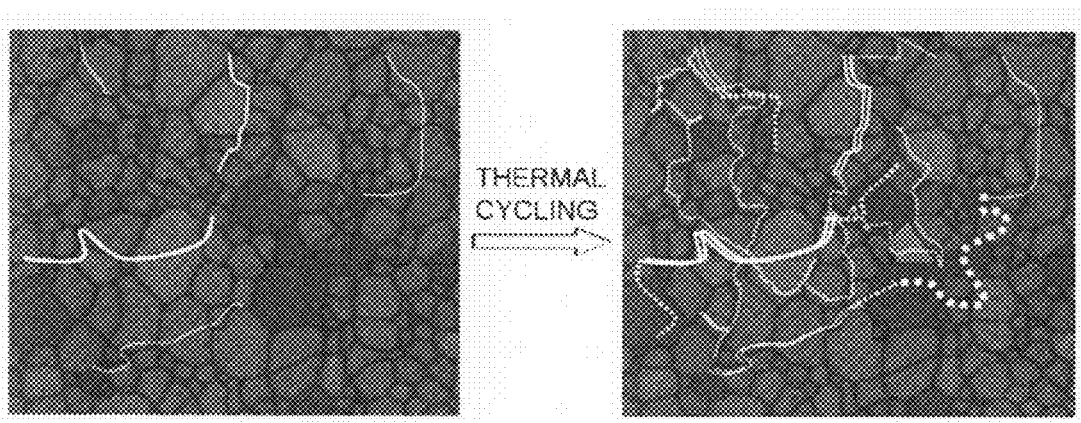

This invention relates to the production of dispersion-toughened cordierite-based material. Cordierite as disclosed herein refers to the material composition $2MgO.2Al_2O_3.5SiO_2$. The improved properties of these dispersion-toughened cordierite materials are a result of the interaction between microcracks and precipitate dispersion. The honeycombs, including filters and substrates, made from these materials combine improved resistance to repeated thermal shocking stress (higher fracture toughness), while also having the traditional filter/substrate properties of high porosity, high strength at low CTE and suitable average pore size with narrow distribution. Thus, products made from the present materials promise not only the traditional high filtration efficiency at low pressure drop, but also, in addition by their particular microstructure offer higher durability and improved resistance to thermal shock.

In the past, the presence of a second phase in a low thermal expansion ceramic has been often considered as undesirable because of the resulting increase in CTE and thus, has not been explored for a beneficial effect on the fracture toughness. In the present invention, microcracked cordierite ceramics are toughened by the incorporation of engineered dispersed second phase particles that interact with the microcracks and limit non-controlled microcrack growth and thus extend thermal shock resistance of the ceramics to higher temperatures and higher number of thermal cycles. Typically, suitable second phase particles of the present invention have higher thermal expansion than cordierite.

The series of figures represented in FIGS. 1A-F depicts various toughening principles for a microcracked ceramic. The pictures some examples of non-dispersion-toughened and dispersion-toughened cordierite illustrating a typical initial microstructure (left side) and the evolved microstructure after thermal cycling or application of thermomechanical stress (right side).

FIG. 1A is a schematic of a comparative state-of-the-art microcracked ceramic (non-dispersion-toughened) with grains in different crystallographic orientation (different shades of grey) without any second phase particles, showing the schematic initial microstructure with its microcracks (white solid lines) in the left side image and the evolved microstructure after thermal cycling or application of thermomechanical stress on the right side with not only the initial microcrack network (white solid lines), but also some additional and extended cracks (extension of existing white solid cracks by the white dotted crack segments) that over time may lead to the association of some cracks and final failure by formation of macrocracks.

FIG. 1B is a schematic of an exemplary comparative microcracked ceramic with grains of different orientation (different grey levels) that are separated by a continuous glassy grain boundary film (shown in the image as a dark line surrounding grains) that is part of an interconnected glass network. On the left hand side is shown the initial ceramic with its microcracks (white solid lines) and on the right hand side is shown the ceramic after thermal cycling or application of thermomechanical stress with additional cracks (white dotted lines) that have formed by easy propagation of the initial cracks through the fragile glass phase along the wetted grain boundaries and provided extended crack growth. This configuration provides even less fracture toughness than the comparative microcracked ceramic shown in FIG. 1A.

Figure 1C:
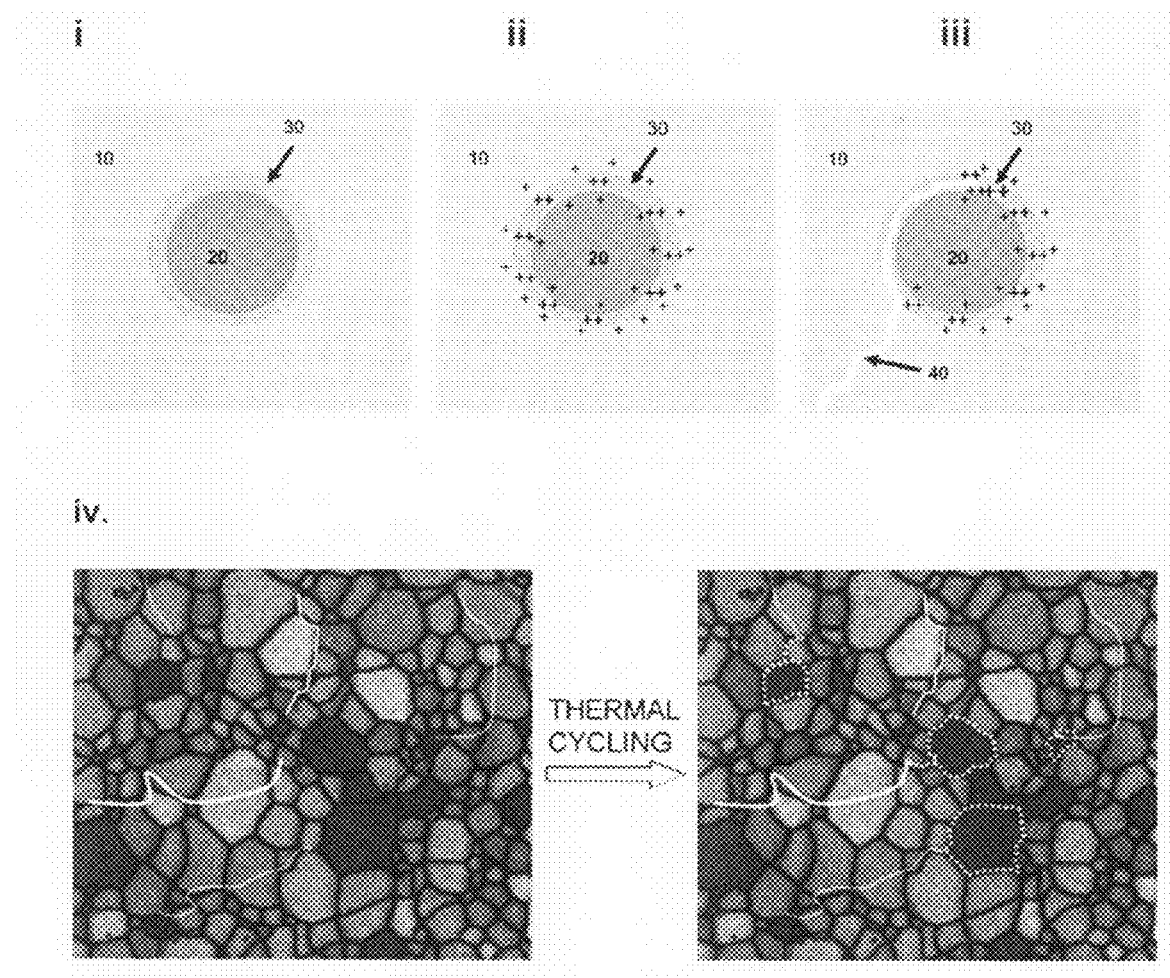
FIG. 1C is a set of schematic drawings of a dispersion-toughened microcracked ceramic of the invention having low elastic modulus interface.

FIG. 1C is a schematic of the invention of a dispersion toughened microcracked ceramic with low elastic modulus interface. The dispersion toughened ceramic with low elastic modulus interface is composed of the matrix of the primary phase and contains dispersed precipitates of the secondary phase. Matrix primary phase and precipitate secondary phase are separated by an interfacial area that is partially wetted by a low elastic modulus glass. The secondary phase (precipitate) has a higher thermal expansion than the primary matrix phase.

FIG. 1C-*i* to FIG. 1C-*iii* show a zoom with one single second phase precipitate (20) in the matrix of the primary phase (10) and the interfacial area (30) with a low elastic modulus glass film (30). For illustrative purposes, the precipitate is depicted as a spherical precipitate. In actual dispersion-toughened cordierite material, the precipitate has a complex three-dimensional shape with faceted and rounded interface portions, and those interface portions depending on the exact crystallography of primary phase, secondary phase and interfacial plane are wetted by the low elastic modulus glass to a different extent. FIG. 1C-*i* shows the matrix with the precipitate after the annealing. At the annealing temperature: the ceramic is relaxed and stress-free. FIG. 1C-*ii* shows the annealed ceramic (relaxed at the annealing temperature) at temperatures below the annealing temperature. The interfacial area and most particularly the low elastic modulus interfacial glass film are strained (indicated by + for some tensile strain and ++ for high tensile strain), because the precipitate and the glass both suffer more contraction during cooling than the matrix due to their higher thermal expansion coefficients. FIG. 1C-*iii* shows a crack propagating in the ceramic that possibly is the result of thermal cycling or application of thermomechanical stress on the ceramic for temperatures below the annealing temperature. The crack interacts with the precipitate's surrounding tensile strain area and propagates into the strained interfacial area and relaxes the strain in that area. The crack propagates under branching and interface debonding within the low elastic modulus glass film under dissipation of energy. Due to the tortuous crack path, the dissipated energy is higher than it would be for a crack propagating in the matrix material only. Long distance propagation of the crack in the primary phase matrix is thus avoided. FIG. 1C-*iv* shows a more global view of the dispersion toughened ceramic with interfacial glass film and demonstrates the role the dispersion with its interfacial area plays during crack propagation and how it can stop the propagating crack.

In FIG. 1C-*iv*, grains of the primary phase are depicted in light grey, second phase dispersed particles in dark grey. The interface between primary phase and second phase dispersion is partially or fully wetted by residual glass. The ceramic is microcracked, microcracks appearing as white lines. The initial microcracks in the initial ceramic are shown as white solid lines. If under applied stress, as result of thermocycling or applied mechanical stress, microcracks tend to grow. They interact with the strained interfacial area of the dispersed precipitates (which is weaker than the matrix or even more weakened by an interfacial glass film with low elastic modulus), penetrate into that weak area, debond the weak interface that surrounds the dispersed second phase precipitates, branch and deflect. As a result, crack paths are tortuous as depicted on the right side in white dotted lines. The energy dissipation due to interaction of the crack with the interface of the dispersant particles slows down crack growth and crack interconnection, and retards formation of macrocracks, being one form of precipitate toughening.

Figure 1D:
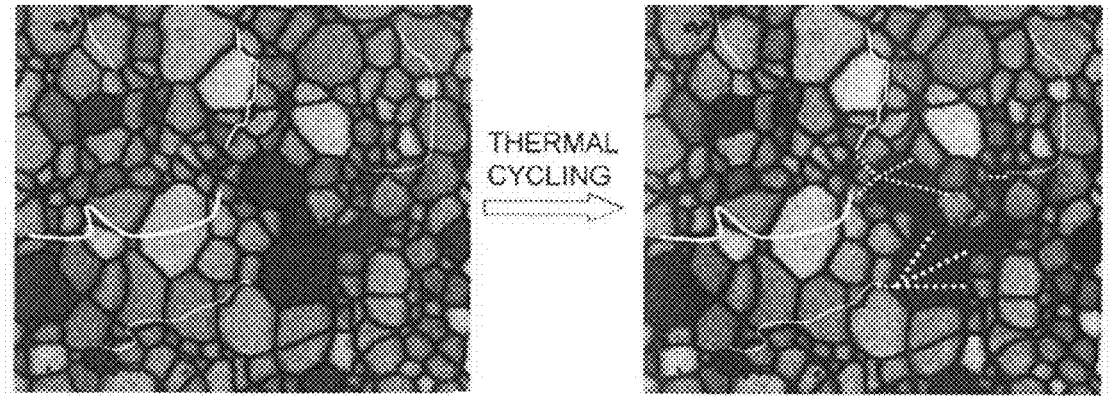

FIG. 1D is a schematic drawing showing the toughening of an exemplary microcracked ceramic by a dispersion of microcracking precipitates. The left side image shows the schematic initial microcracked ceramic (grains of the primary phase are depicted in light grey) with its initial microcracks (white solid lines) and second phase particles (dark grey grains), the right side image shows the microstructure after thermal cycling or thermomechanical stress application with the evolved microcrack network. Second phase dispersed particles are shown in dark grey. The dispersed second phase particles have a much lower microcracking energy than the primary ceramic phase. Under stress, microcracks tend to grow. As shown in FIG. 1D, during their growth they interact with the dispersed precipitates; the dispersed phase is much weaker than the primary phase and undergoes extensive microcracking, as indicated by white dotted lines. As a result, energy dissipation occurs by microcracking of the second phase particles, second phase microcracking slows down the crack growth and crack interconnection, and retards formation of macrocracks.

Figure 1E:
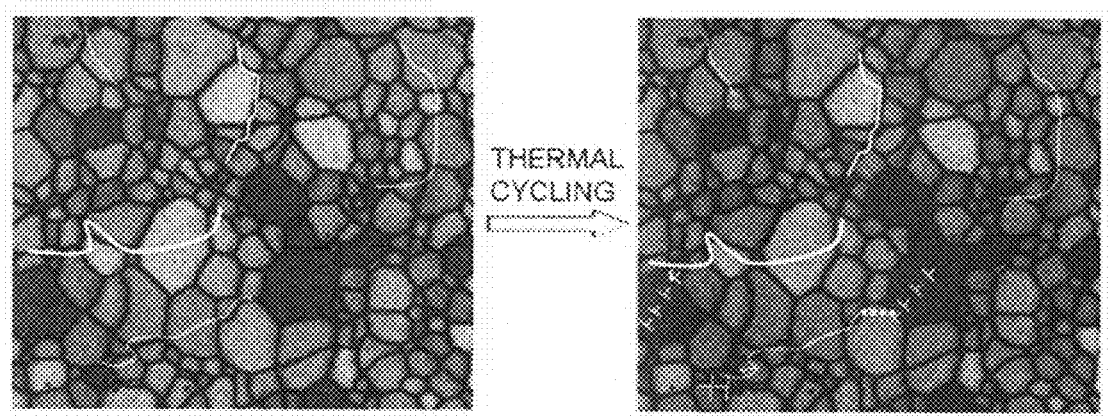

FIG. 1E is a schematic showing toughening of an exemplary microcracked ceramic by a dispersion of plastically deformable, soft precipitates. Left and right images show the microcracked ceramic before and after thermal cycling or thermomechanical stress application, respectively. Grains of the primary phase are depicted in light grey; second phase dispersed soft particles in dark grey. The dispersed second phase particles are soft and undergo plastic deformation under stress. The ceramic is microcracked; microcracks are shown as white lines. When under stress growing microcracks interact with the soft dispersed precipitates, the second phase absorbing energy for plastic deformation (indicated in the image by dislocations ⊥). As a result, crack growth and interconnection of cracks is slowed down, and formation of macrocracks and failure of the microcracked ceramic retarded.

Figure 1F:
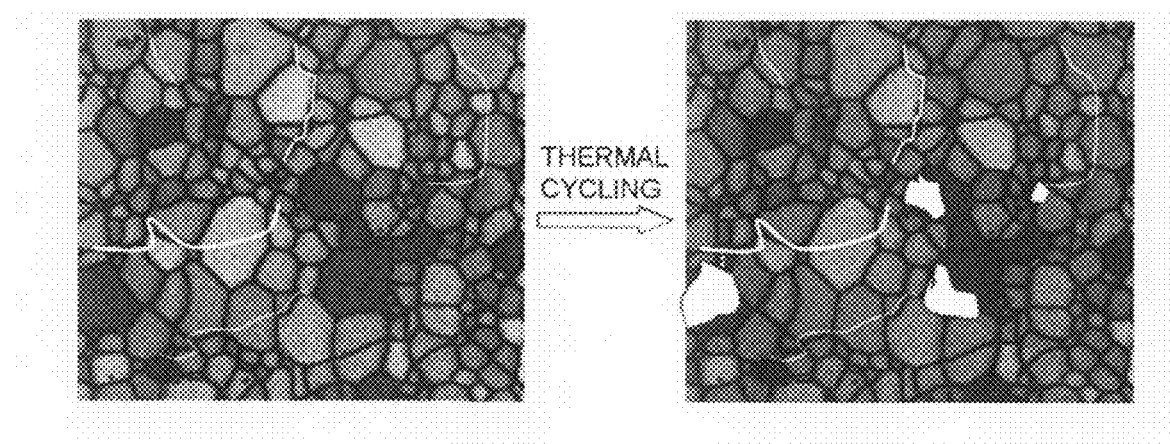

FIG. 1F is a schematic showing toughening of an exemplary microcracked ceramic by a dispersion of precipitates that undergo stress-induced phase transformation under volume increase. The left and right images show the microcracked ceramic before and after thermal cycling or thermomechanical stress application. Grains of the primary phase are depicted in light grey; second phase dispersed soft particles in dark grey. The dispersed second phase particles undergo phase transformation under stress. The ceramic is microcracked; microcracks are shown as white lines. When microcracks penetrate a second phase particle, the stress field at the crack tip induces phase transformation of the second phase particle (transformed second phase particles are shown as white areas). If the phase transformation occurs under volume increase of dispersed second phase, the propagating crack is stopped. Energy dissipation during thermal cycling or other mechanical solicitation is used for the phase transformation of dispersed second phase particles. Thus, crack growth and interconnection of cracks is slowed down, and formation of macrocracks retarded.

Figure 2:
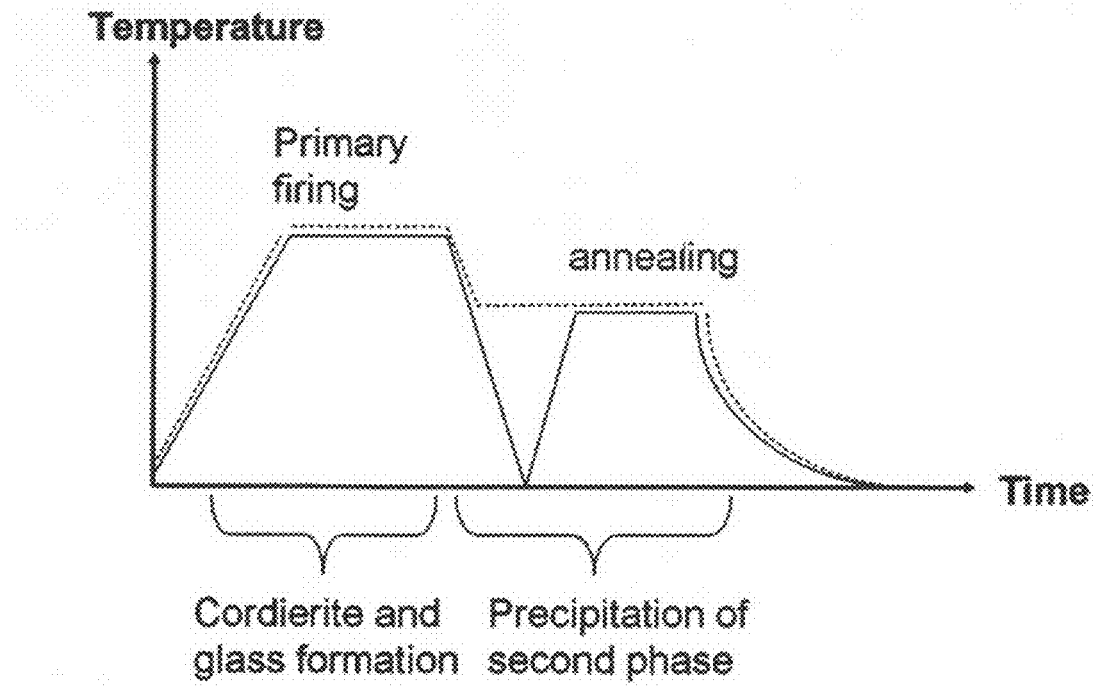
FIG. 2 is a graph schematically depicting firing cycles of the cordierite of the present invention.

FIG. 2 schematically depicts firing cycles of the invention with a cordierite and glass-forming main firing step, followed by an annealing step for forming the second phase precipitate dispersion from the glass.

Figure 3:
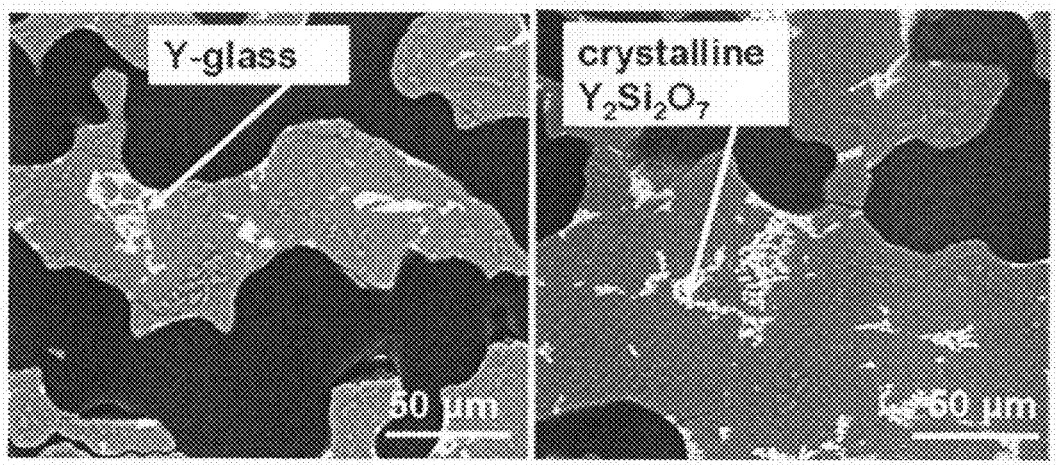
FIG. 3 is a set of SEM micrographs of the microstructure of cordierite with additives both before and after annealing of the glassy phase.

FIG. 3 is a series of pictures of the material microstructure of cordierite with additives both before and after ceraming of the glassy phase. Specifically, FIG. 3 shows B-type cordierite with 3% $Y_2O_3$ as additive after initial firing (left) and after annealing (right).

Figure 4:
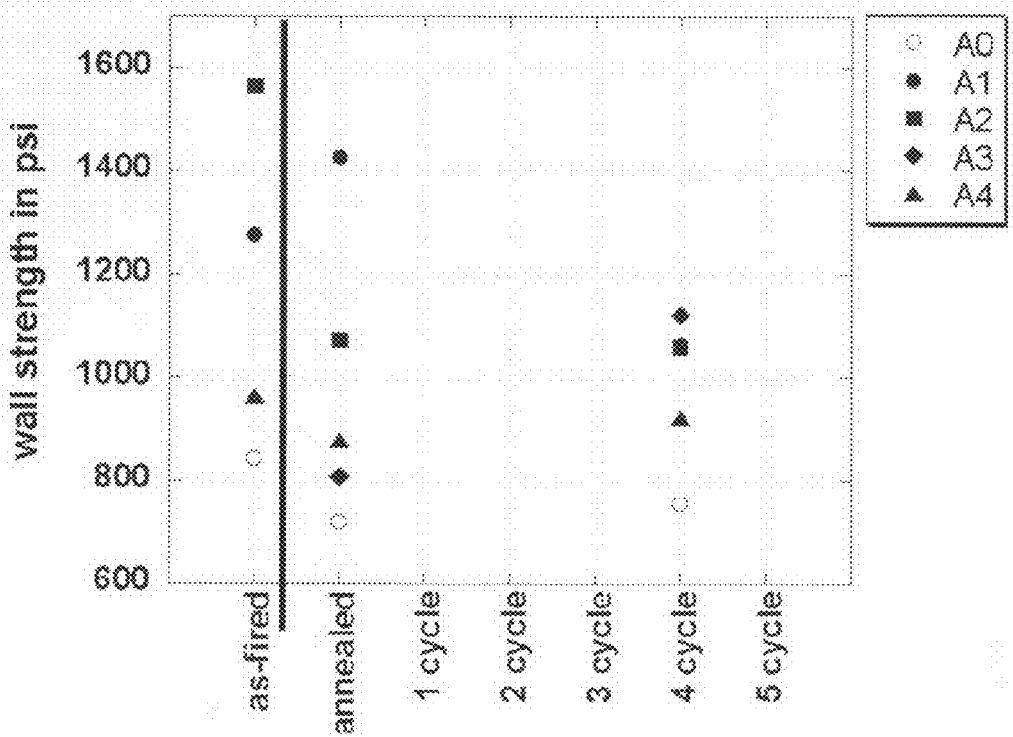
FIG. 4 is a plot of the wall strength of comparative material formulation A0 and material formulations A1-A4 of the invention after initial firing, annealing and further cycling.

FIG. 4 is a plot of the wall strength of comparative material A0 and inventive materials A1, A2, A3, and A4 after initial firing (1), annealing (2) and further cycling (3). The plot shows that the additive derived materials show higher strength than the additive-free reference material A0 in as-fired, annealed and cycled state. The strength of the annealed materials with their stabilized microcrack network is significantly higher, in several examples by more than a third higher than the reference material. Data were derived from honeycomb of type A studied cordierite-based materials with 1" (200/16) geometry.

Figure 5A:
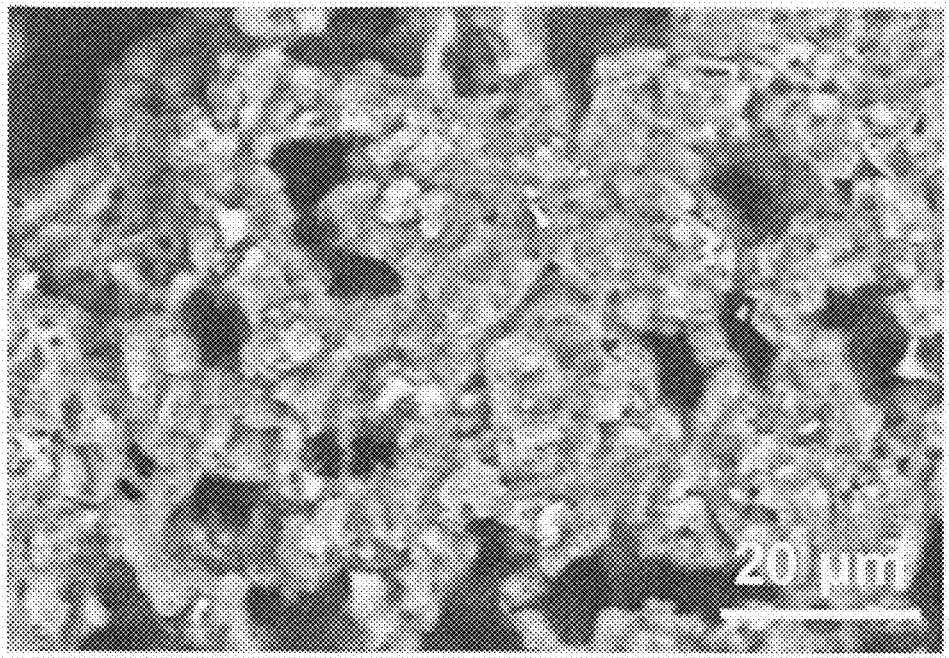
FIG. 5*a* is a set of SEM micrographs of a comparative material formulation at various stages of heating.
Figure 5A:
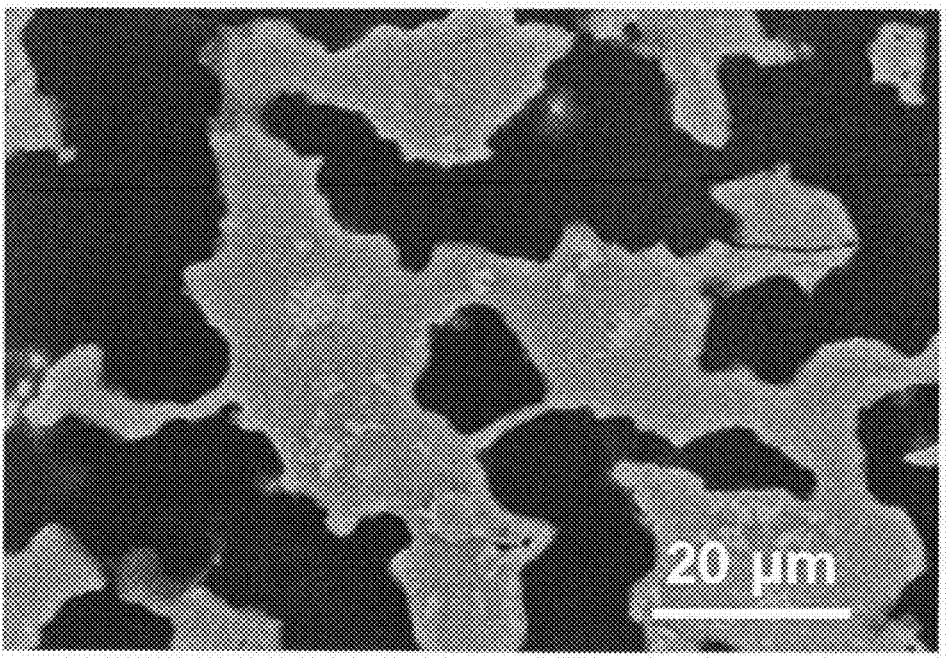
Figure 5B:
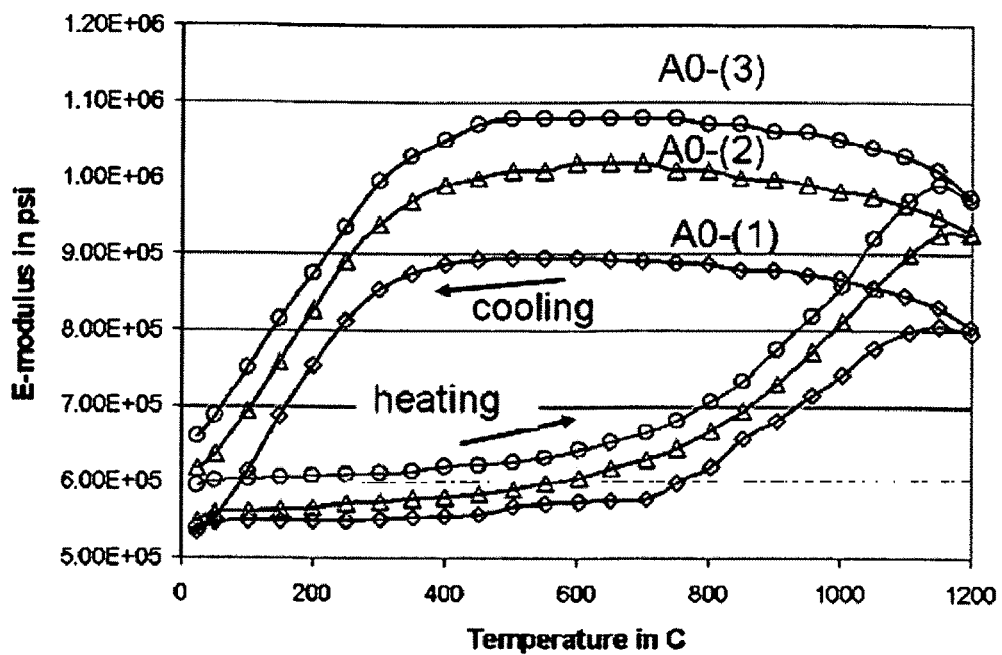
FIG. 5*b* is a plot of the elastic modulus for a comparative material formulation at various stages of heating.
Figure 5C:
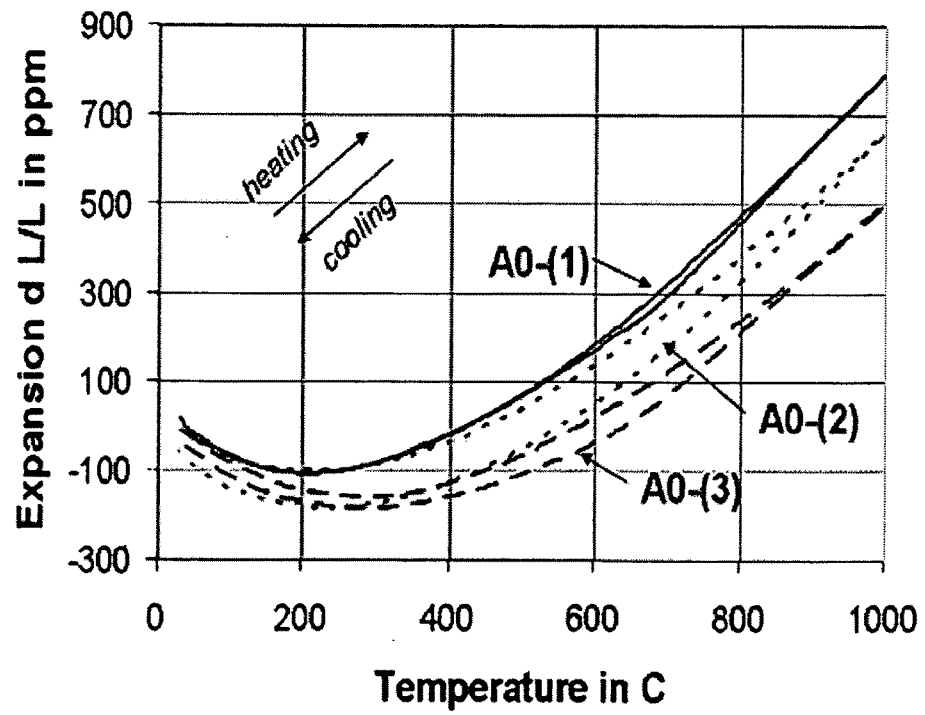
FIG. 5*c* is a plot of the thermal expansion for a comparative material formulation at various stages of heating.

FIG. 5a-c illustrates property details for the type A reference material including microstructure, evolution of E-mod curve and CTE curve with annealing. FIG. 5a shows SEM micrographs of A0, the reference A-type cordierite material without addition of additives; A0-(1) for the A0 material after firing to 1415° C., A0-(2) for the A0 material after annealing for 4h at 1200° C. FIG. 5b is a plot of the elastic modulus (in psi) as a function of temperature (in ° C.) during heating and cooling of A), the reference material of A-type cordierite; A0-(1) for the A0 material after initial firing to 1415° C., A0-(2) for the A0 material after its initial firing to 1415° C. and annealing for 4h at 1200° C., A0-(3) for the A0 material after its initial firing to 1415° C., annealing for 4h at 1200° C. and 4 further temperature cycles from room temperature to 1200° C. FIG. 5c is the plot of the thermal expansion (dl/l in ppm) versus temperature (in ° C.) during heating and cooling for A0, the reference material of A-type cordierite; A0-(1) for the A0 material after initial firing to 1415° C., A0-(2) for the A0 material after its initial firing to 1415° C. and annealing for 4h at 1200° C., A0-(3) for the A0 material after its initial firing to 1415° C., annealing for 4h at 1200° C. and 4 further temperature cycles from room temperature to 1200° C.

Figure 6A:
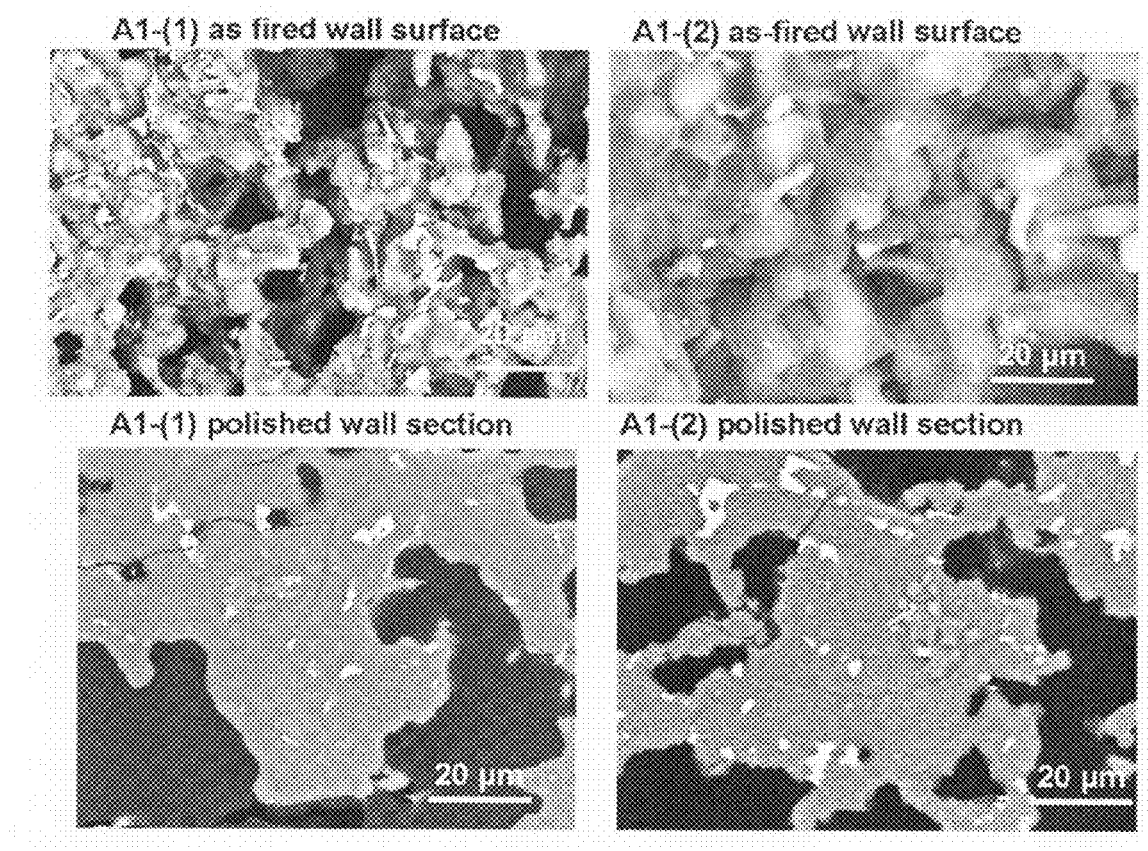
FIG. 6*a* is a set of SEM micrographs of material formulation A1 of the present invention at various stages of heating.
Figure 6B:
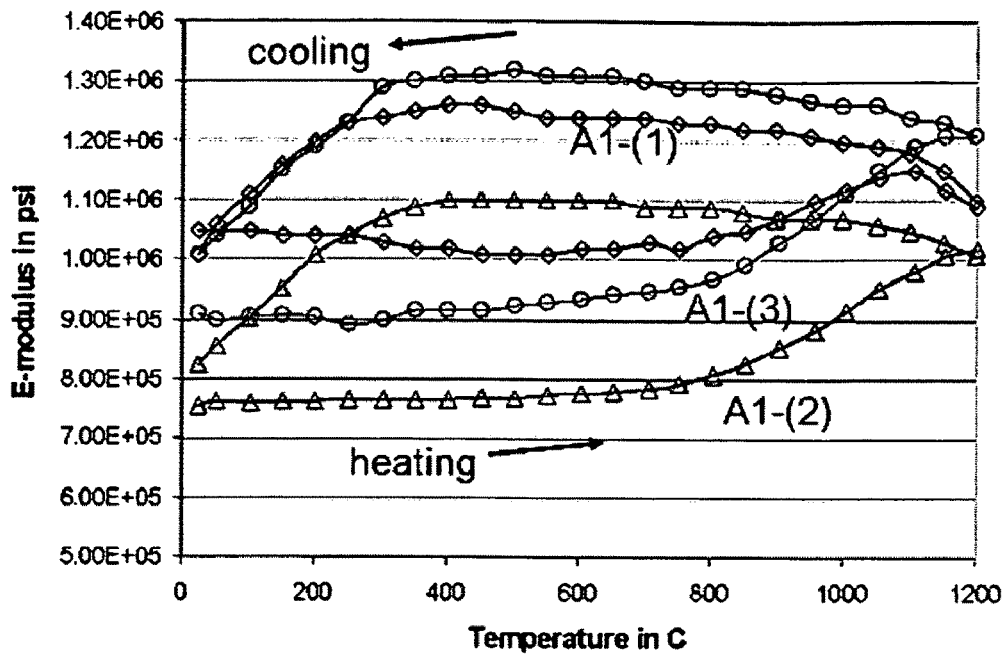
FIG. 6*b* is a plot of the elastic modulus for material formulation A1 of the present invention at various stages of heating.
Figure 6C:
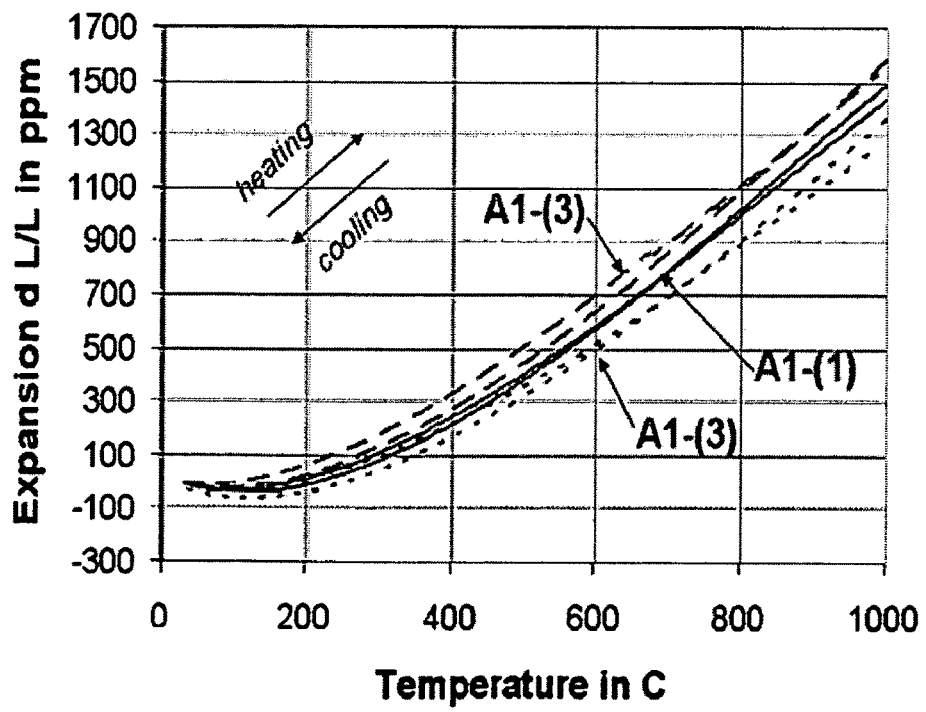
FIG. 6*c* is a plot of the thermal expansion for material formulation A1 of the present invention at various stages of heating.

FIG. 6a-c illustrates property details for the type A material with addition of 2% titania including microstructure, evolution of E-mod curve and CTE curve with annealing. FIG. 6a shows SEM micrographs of A1, A-type cordierite material with addition of 2% titania; A1-(1) for the A1 material after initial firing to 1385° C., A1-(2) for the A1 material after its initial firing to 1385° C. and annealing for 4 h at 1200° C. FIG. 6b is a plot of the elastic modulus (in psi) as a function of temperature (in ° C.) during heating and cooling of A1, A-type cordierite material with addition of 2% titania; A1-(1) for the A1 material after initial firing to 1385° C., A1-(2) for the A1 material after its initial firing to 1385° C. and annealing for 4 h at 1200° C., A1-(3) for the A1 material after its initial firing to 1385° C., annealing for 4 h at 1200° C. and 4 further temperature cycles from room temperature to 1200° C. FIG. 6c is the plot of the thermal expansion (dl/l in ppm) versus temperature (in ° C.) during heating and cooling for A1, A-type cordierite material with 2% titania addition; A1-(1) for the A1 material after initial firing to 1385° C., A1-(2) for the A1 material after its initial firing to 1385° C. and annealing for 4 h at 1200° C., A1-(3) for the A1 material after its initial firing to 1385° C., annealing for 4 h at 1200° C. and 4 further temperature cycles from room temperature to 1200° C.

Figure 7A:
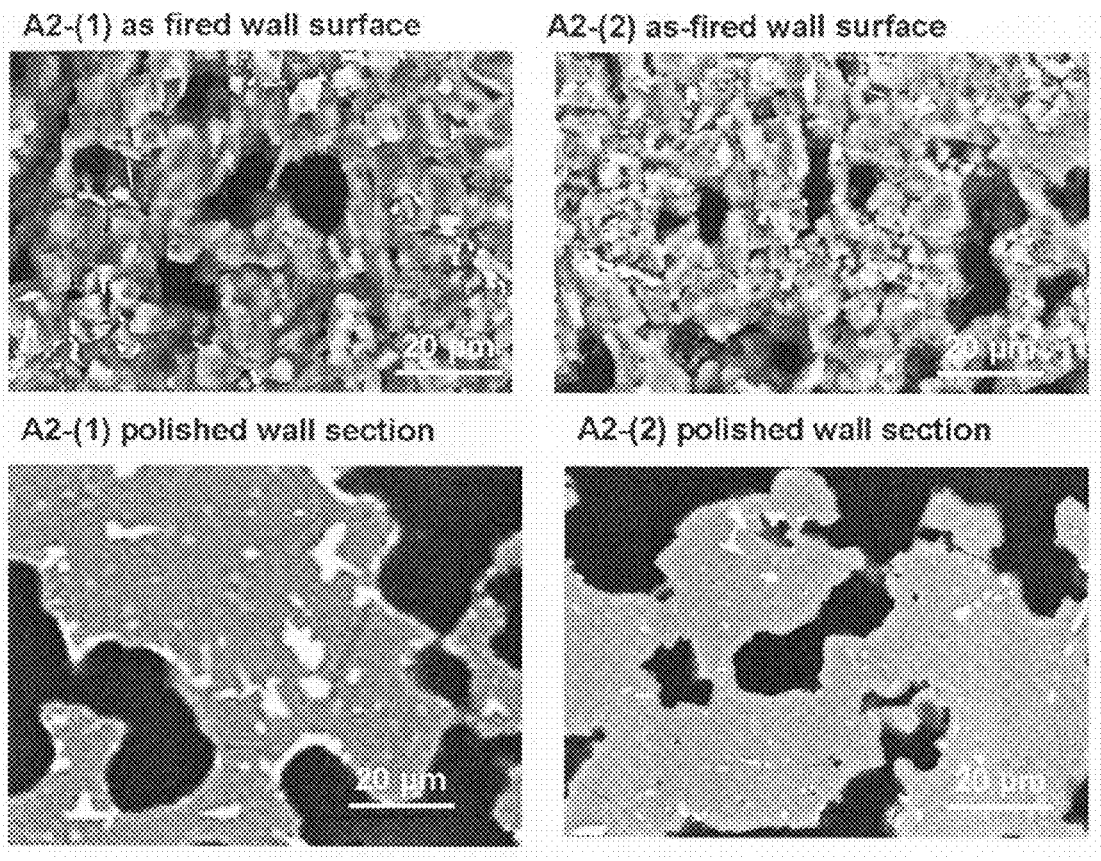
FIG. 7*a* is a set of SEM micrographs of material formulation A2 of the present invention at various stages of heating.
Figure 7B:
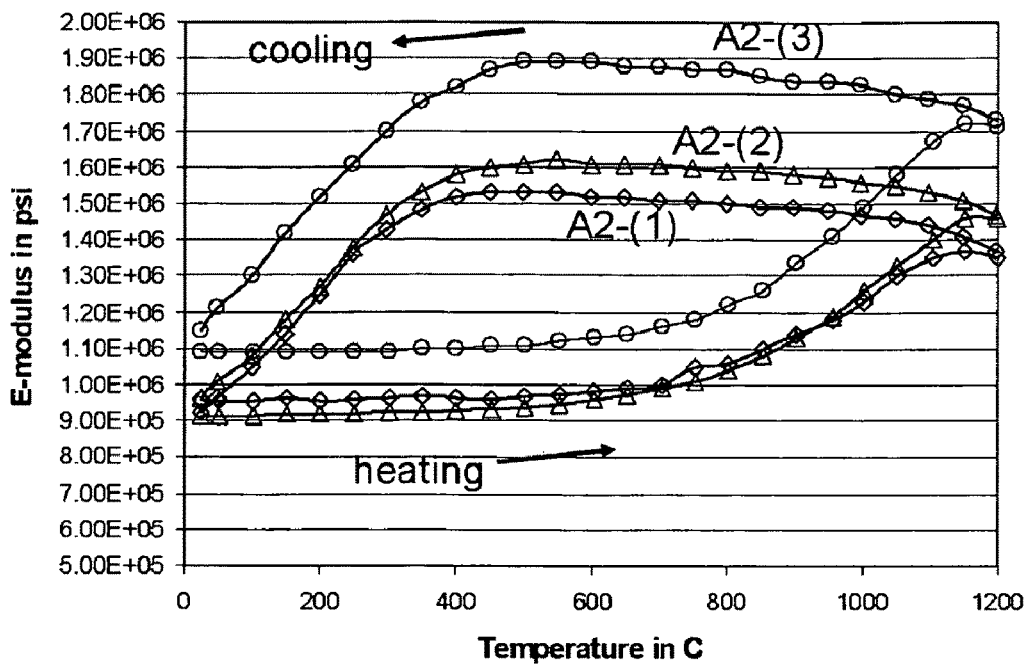
FIG. 7*b* is a plot of the elastic modulus for material formulation A2 of the present invention at various stages of heating.
Figure 7C:
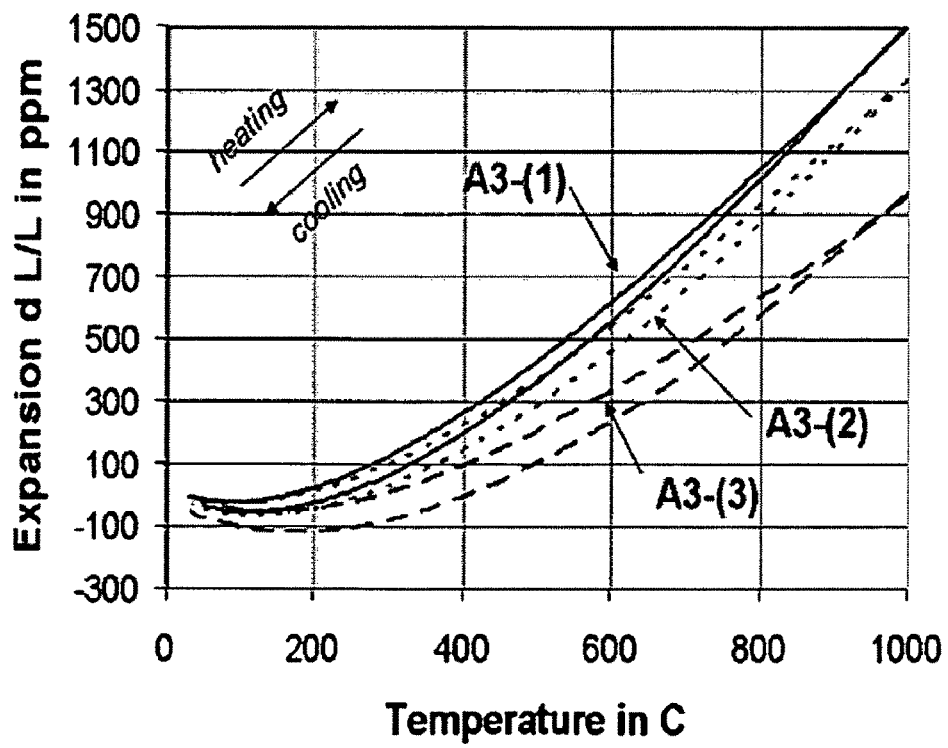
FIG. 7*c* is a plot of the thermal expansion for material formulation A2 of the present invention at various stages of heating.

FIG. 7a-c illustrates property details for the type A material with addition of 2% (titania+alumina) including microstructure, evolution of E-mod curve and CTE curve with annealing. FIG. 7a shows SEM micrographs of A2, A-type cordierite material with addition of 2% titania and iron oxide; A2-(1) for the A2 material after initial firing to 1395° C., A2-(2) for the A2 material after its initial firing to 1395° C. and annealing for 4 h at 1200° C. FIG. 7b is a plot of the elastic modulus (in psi) as a function of temperature (in ° C.) during heating and cooling cycle of A2, A-type cordierite material with addition of 2% titania and iron oxide; A2-(1) for the A2 material after initial firing to 1395° C., A2-(2) for the A2 material after its initial firing to 1395° C. and annealing for 4 h at 1200° C., A2-(3) for the A2 material after its initial firing to 1395° C., annealing for 4 h at 1200° C. and 4 further temperature cycles from room temperature to 1200° C. FIG. 7c is the plot of the thermal expansion (dl/l in ppm) versus temperature (in ° C.) during heating and cooling for A2, A-type cordierite material with 2% titania and iron oxide addition; A2-(1) for the A2 material after initial firing to 1395° C., A2-(2) for the A2 material after its initial firing to 1395° C. and annealing for 4 h at 1200° C., A2-(3) for the A2 material after its initial firing to 1395° C., annealing for 4 h at 1200° C. and 4 further temperature cycles from room temperature to 1200° C.

Figure 8A:
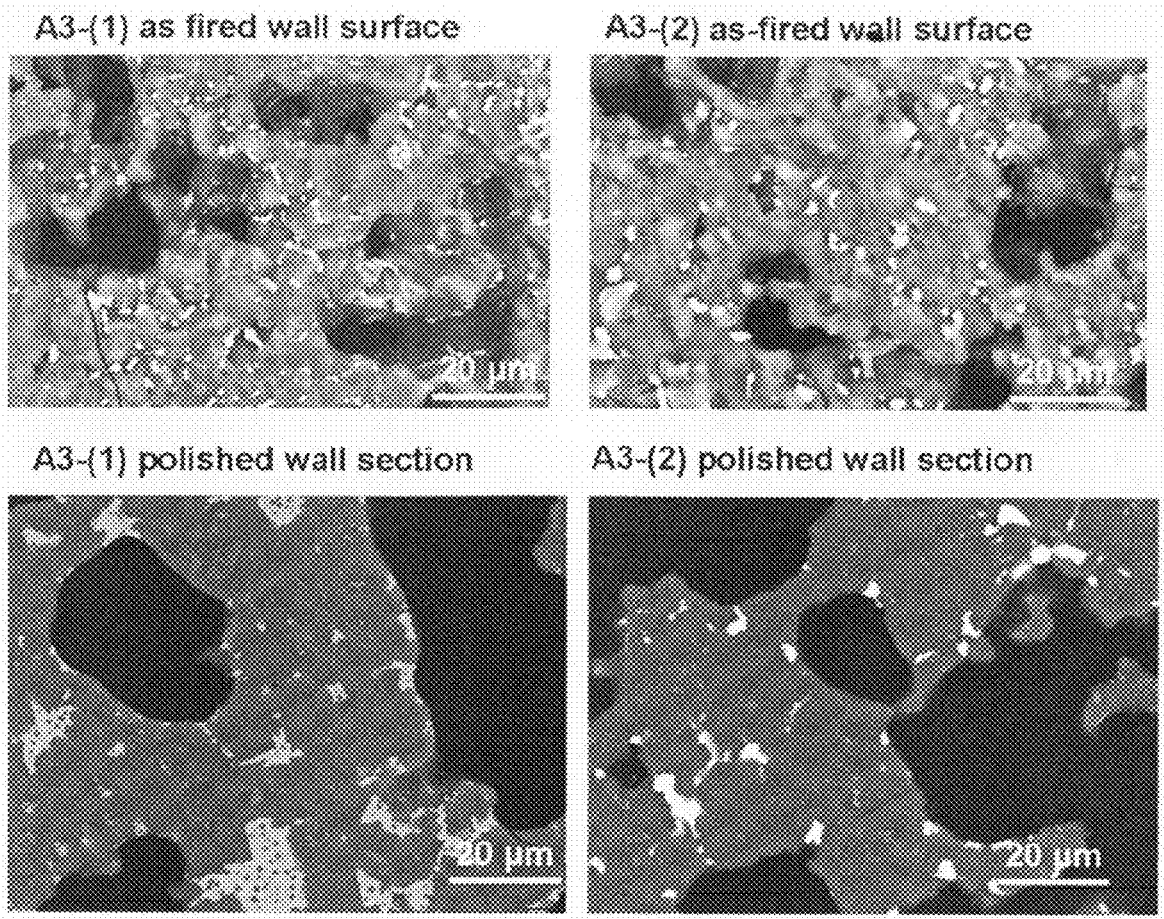
FIG. 8*a* is a set of SEM micrographs of material formulation A3 of the present invention at various stages of heating.
Figure 8B:
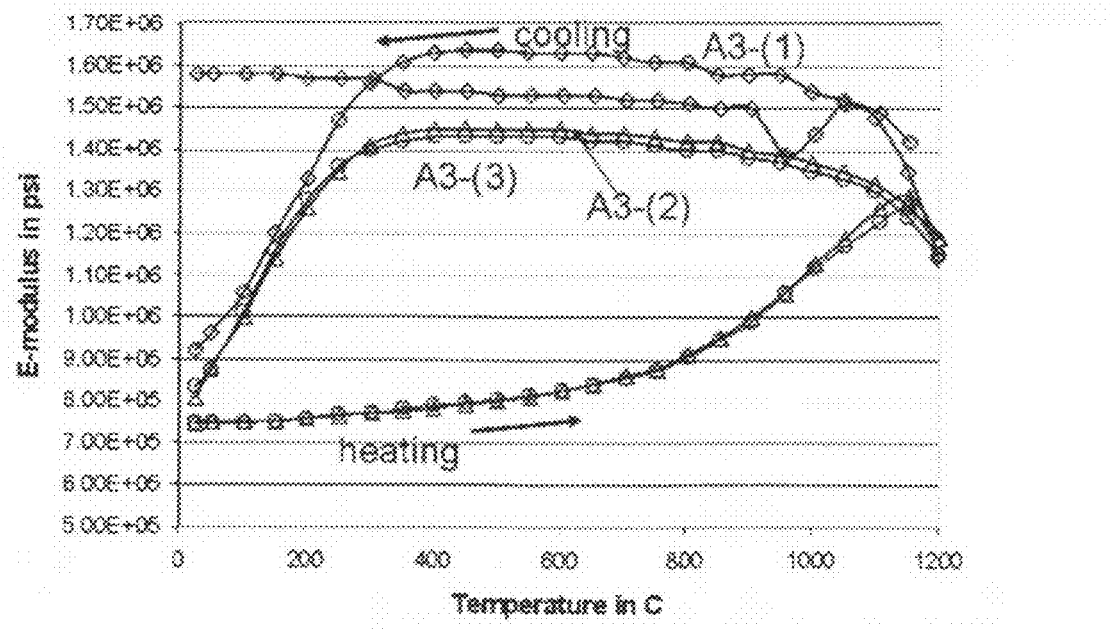
FIG. 8*b* is a plot of the elastic modulus for material formulation A3 of the present invention at various stages of heating.
Figure 8C:
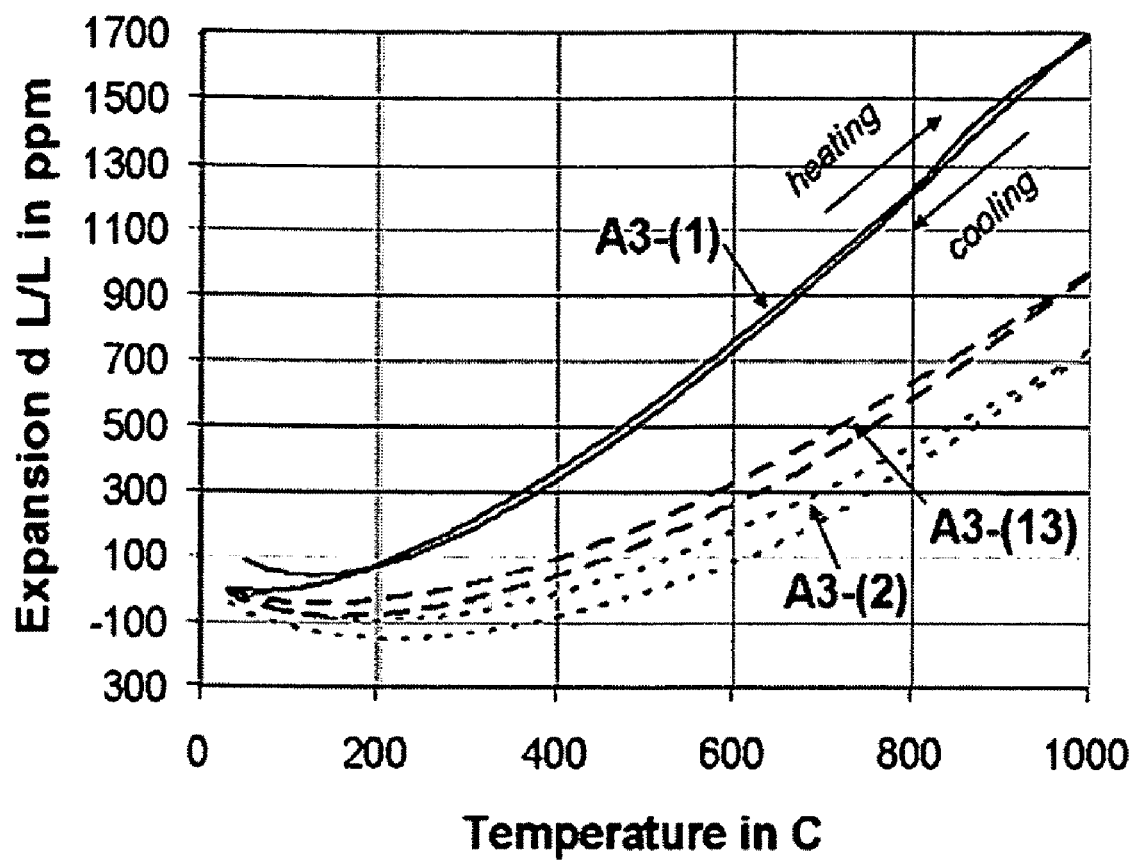
FIG. 8*c* is a plot of the thermal expansion for material formulation A3 of the present invention at various stages of heating.

FIG. 8a-c illustrates property details for the type A material with addition of 2% (yttria and silica) including microstructure, evolution of E-mod curve and CTE curve with annealing. FIG. 8a shows SEM micrographs of A3, A-type cordierite material with addition of 2% yttria and silica; A3-(1) for the A3 material after initial firing to 1390° C., A3-(2) for the A3 material after annealing for 4 h at 1200° C. FIG. 8b is a plot of the elastic modulus (in psi) as a function of temperature (in ° C.) during heating and cooling of A3, A-type cordierite material with addition of 2% yttria and silica; A3-(1) for the A3 material after initial firing to 1390° C., A3-(2) for the A3 material after its initial firing to 1390° C. and annealing for 4 h at 1200° C., A3-(3) for the A3 material after its initial firing to 1390° C., annealing for 4 h at 1200° C. and 4 further temperature cycles from room temperature to 1200° C. FIG. 8c is the plot of the thermal expansion (dl/l in ppm) versus temperature (in ° C.) during heating and cooling for A3, A-type cordierite material with 2% yttria and silica addition; A3-(1) for the A3 material after initial firing to 1390° C., A3-(2) for the A3 material after its initial firing to 1390° C. and annealing for 4 h at 1200° C., A3-(3) for the A3 material after its initial firing to 1390° C., annealing for 4 h at 1200° C. and 4 further temperature cycles from room temperature to 1200° C.

Figure 9A:
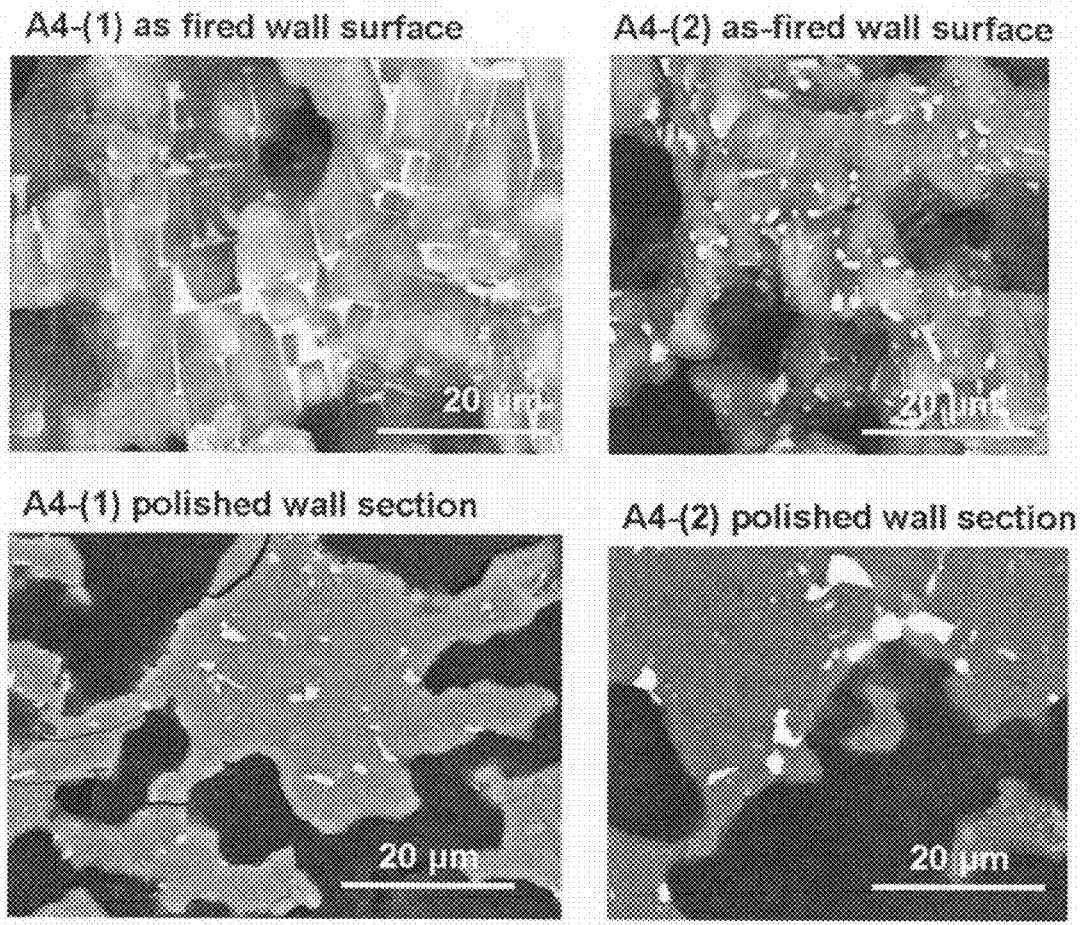
FIG. 9*a* is a set of SEM micrographs of material formulation A4 of the present invention at various stages of heating.
Figure 9B:
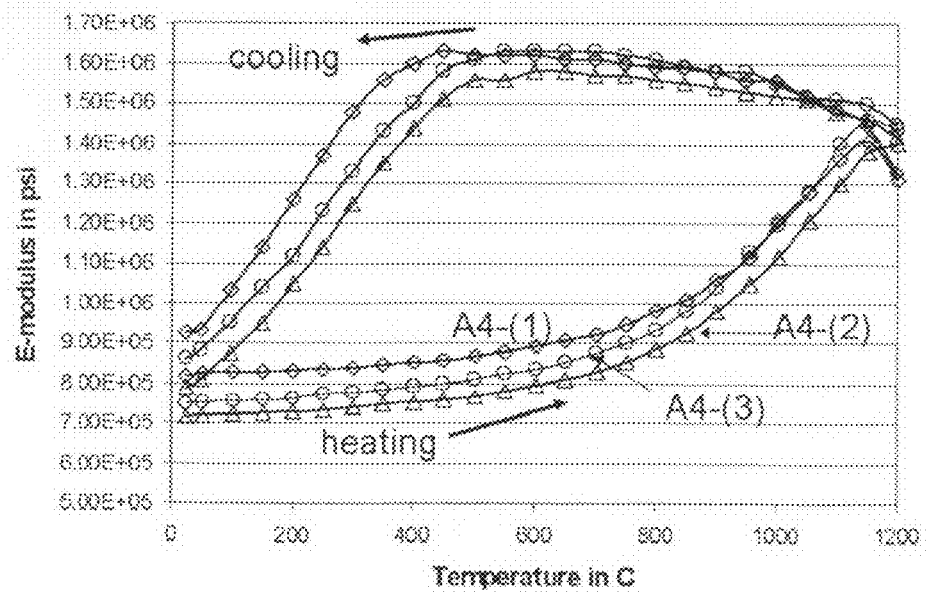
FIG. 9*b* is a plot of the elastic modulus for material formulation A4 of the present invention at various stages of heating.
Figure 9C:
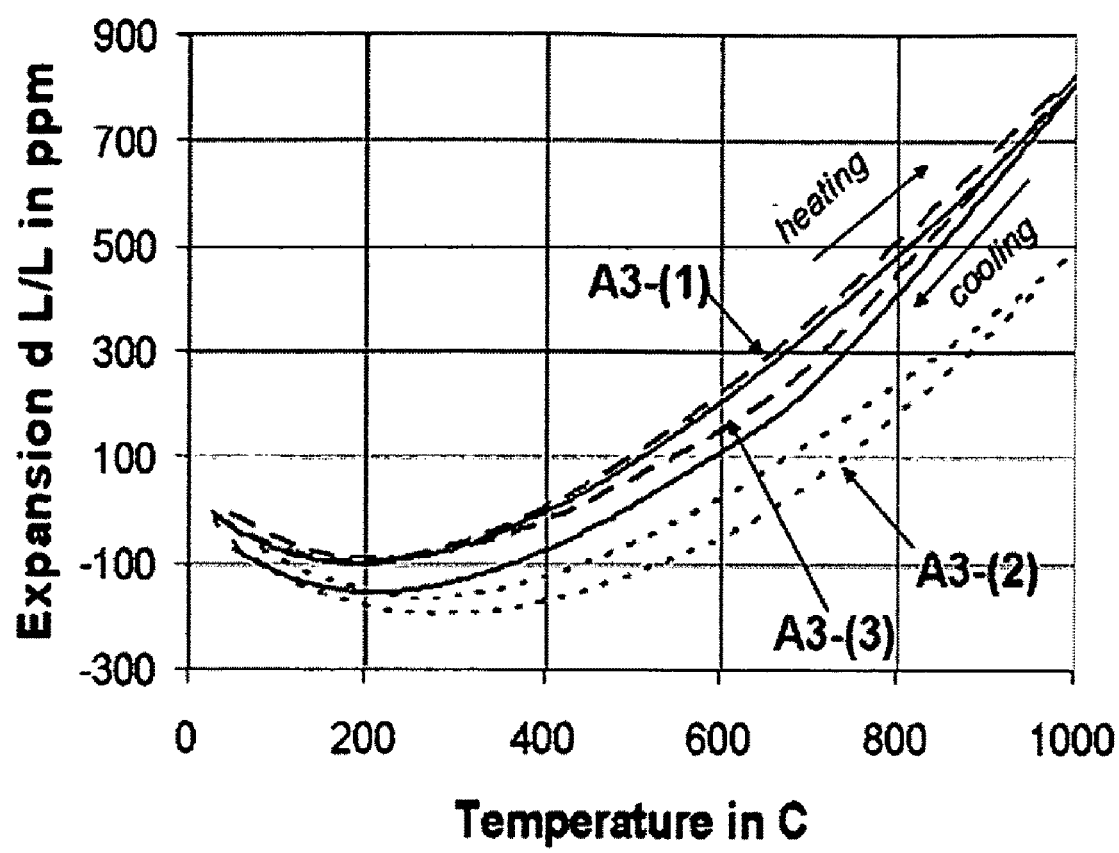
FIG. 9*c* is a plot of the thermal expansion for material formulation A4 of the present invention at various stages of heating.

FIG. 9a-c illustrates property details for the type A material with addition of 2% (yttria and alumina) including microstructure, evolution of E-mod curve and CTE curve with annealing. FIG. 9a shows SEM micrographs of A4, A-type cordierite material with addition of 2% yttria and alumina; A4-(1) for the A4 material after initial firing to 1395° C., A4-(2) for the A4 material after its initial firing to 1395° C. and annealing for 4 h at 1200° C. FIG. 9b is a plot of the elastic modulus (in psi) as a function of temperature (in ° C.) during heating and cooling of A4, A-type cordierite material with addition of 2% yttria and alumina; A4-(1) for the A4 material after initial firing to 1395° C., A4-(2) for the A4 material after its initial firing to 1395° C. and annealing for 4 h at 1200° C., A4-(3) for the A4 material after its initial firing to 1395° C., annealing for 4 h at 1200° C. and 4 further temperature cycles from room temperature to 1200° C. FIG. 9c is the plot of the thermal expansion (dl/l in ppm) versus temperature (in ° C.) during heating and cooling for A4, A-type cordierite material with 2% yttria and alumina addition; A4-(1) for the A4 material after initial firing to 1395° C., A4-(2) for the A4 material after its initial firing to 1395° C. and annealing for 4 h at 1200° C., A4-(3) for the A4 material after its initial firing to 1395° C., annealing for 4 h at 1200° C. and 4 further temperature cycles from room temperature to 1200° C.

Figure 10:
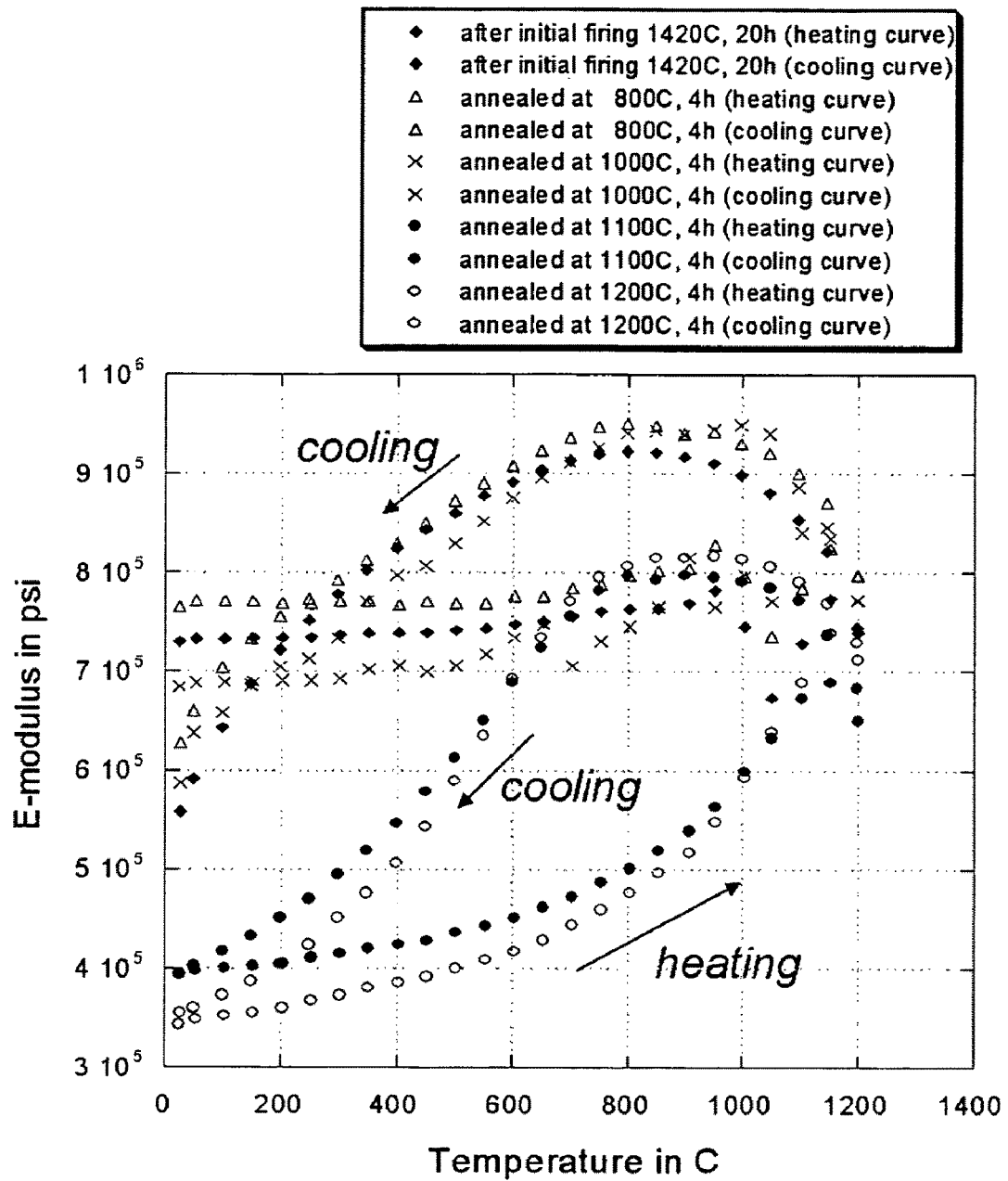
FIG. 10 is a plot of the elastic modulus of the type B cordierite formulation with 3% $Y_2O_3$ of Table 2 at various stages of heating.

FIG. 10 shows the elastic modulus of type B cordierite material with 3% $Y_2O_3$ addition after initial firing at 1420° C. for 20 hours and after annealing for 4 hours at 800° C., 1000° C. and 1200° C. FIG. 10 shows the evolution of the elastic modulus during heating and cooling for B-type batches with 3% yttria addition after the initial firing and after annealing at different temperatures. After initial firing and for annealing at 800, 900 and 1000° C., the shape of the heating and cooling curves is similar. It changes for annealing at 1100 and 1200° C., indicating by the large hysteresis that in materials annealed at the higher temperature extensive microcracking occurs.

Figure 11:
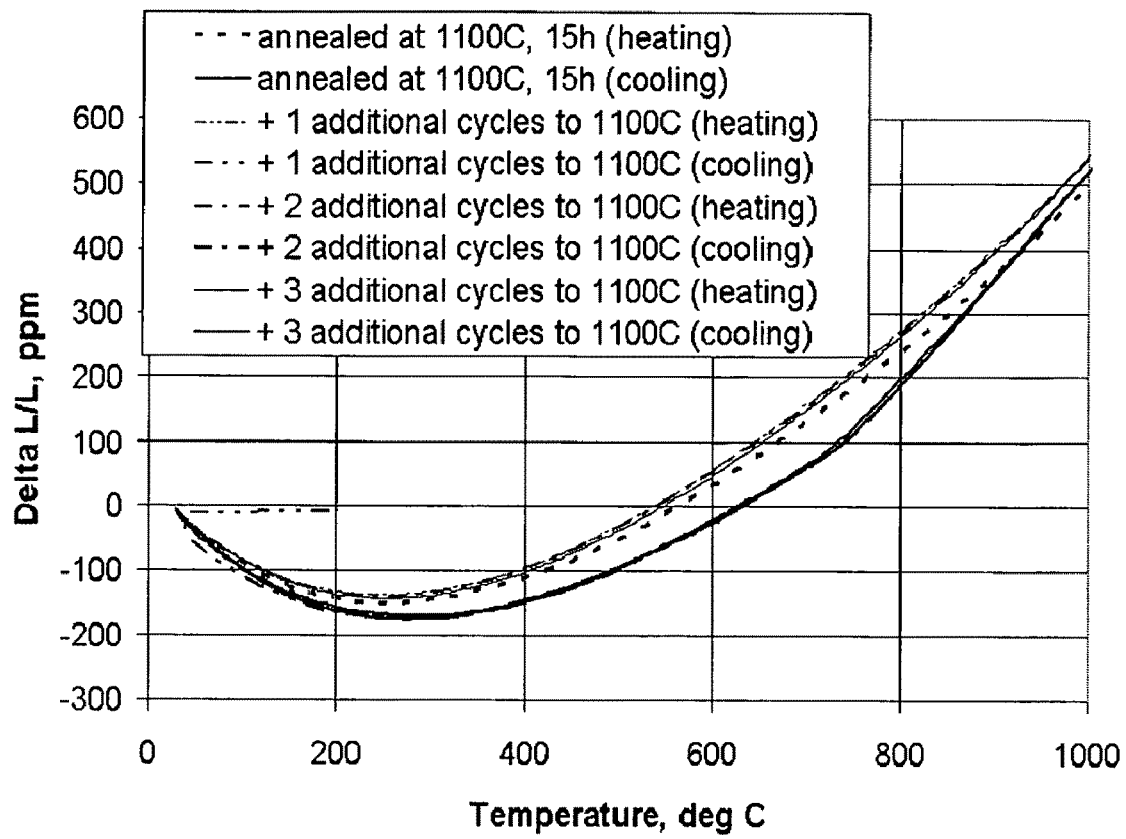
FIG. 11 is a plot of the thermal expansion of the type B cordierite formulation with 3% $Y_2O_3$ of Table 2 at various stages of heating.

FIG. 11 shows a CTE of type B cordierite with 3% $Y_2O_3$ addition after initial firing at 1420° C. for 20 hours and after annealing for 1 hour, 2 hours, 3 hours, and 4 hours at 1100° C. FIG. 11 is a plot that shows that after annealing the material B with addition of 3% yttria at 1100° C. for 15 h, there is no further evolution in its thermal expansion curve when it is cycled in addition 1, 2 or 3 additional times to 1100° C. The lack in change in the thermal expansion curve is an indication for a stable microcrack network.

Figure 12:
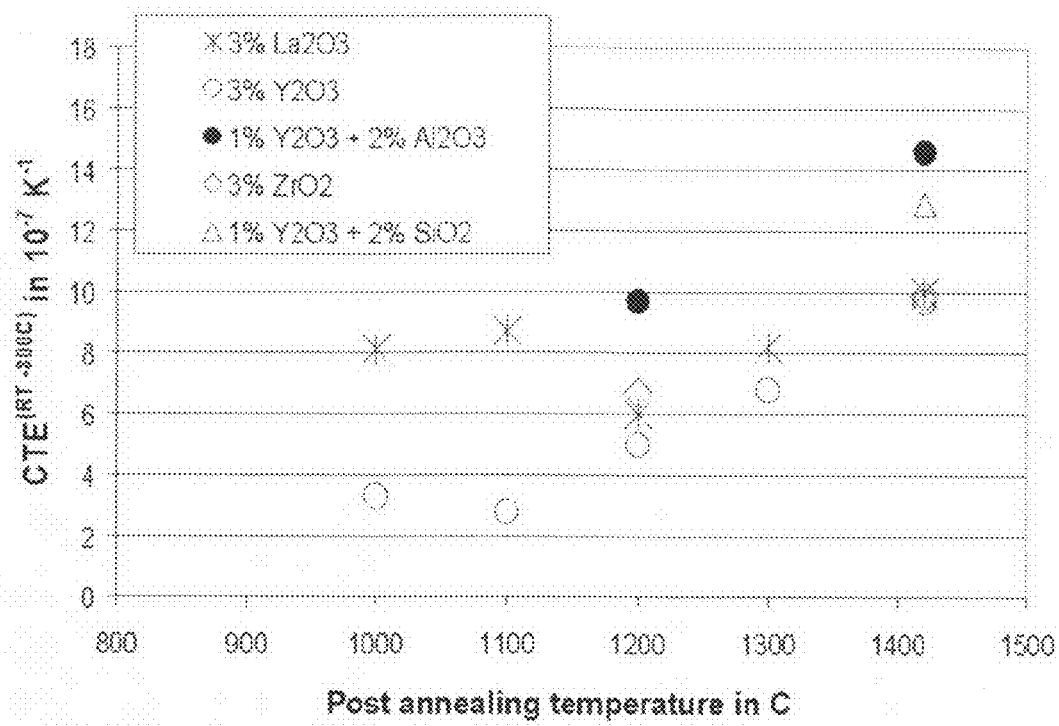
FIG. 12 is a plot of the thermal expansion of various formulations of the type B cordierite (3% $La_2O_3$, 3% $Y_2O_3$, 1% $Y_2O_3$+2% $Al_2O_3$, 3% $ZrO_2$ or 1% $Y_2O_3$+2% $SiO_2$) of Table 2 at various stages of heating.

FIG. 12 shows a CTE of type B cordierite with various additions (3% $La_2O_3$, 3% $Y_2O_3$, 1% $Y_2O_3$+2% $Al_2O_3$, 3% $ZrO_2$ or 1%$Y_2O_3$+2% $SiO_2$) after initial firing at 1420° C. for 20 hours and after annealing at different temperature. FIG. 12 is a plot of thermal expansion coefficients from room temperature to 800° C. for B-type materials with the indicated additives and amounts after their initial firing at >1400° C. and after annealing at 1300° C., 1200° C., 1100° C. or 1000° C.

Figure 13:
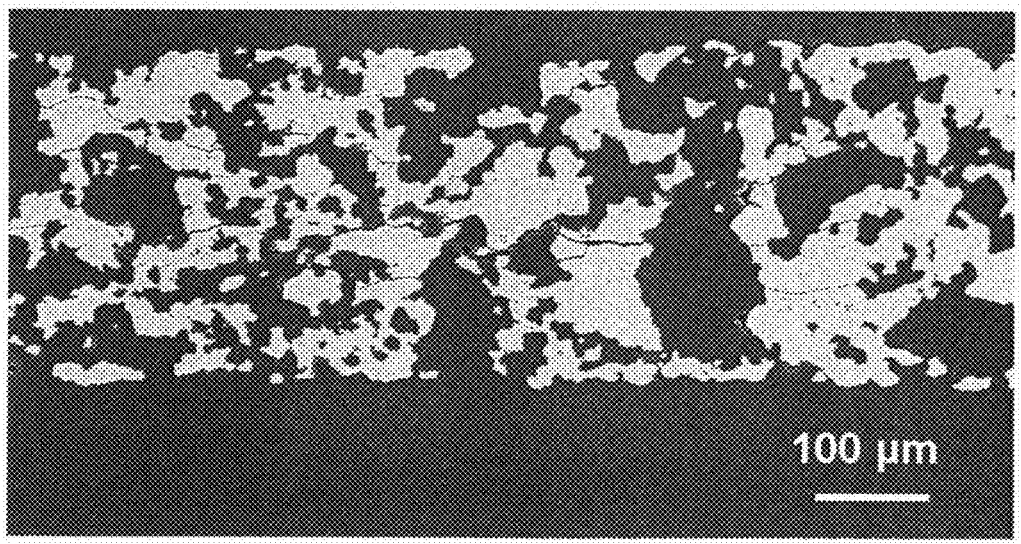
FIG. 13 is an SEM image illustrating the straight microcrack path in comparative material A0.

FIG. 13 is an SEM image illustrating the straight microcrack path in type A reference material.

Figure 14:
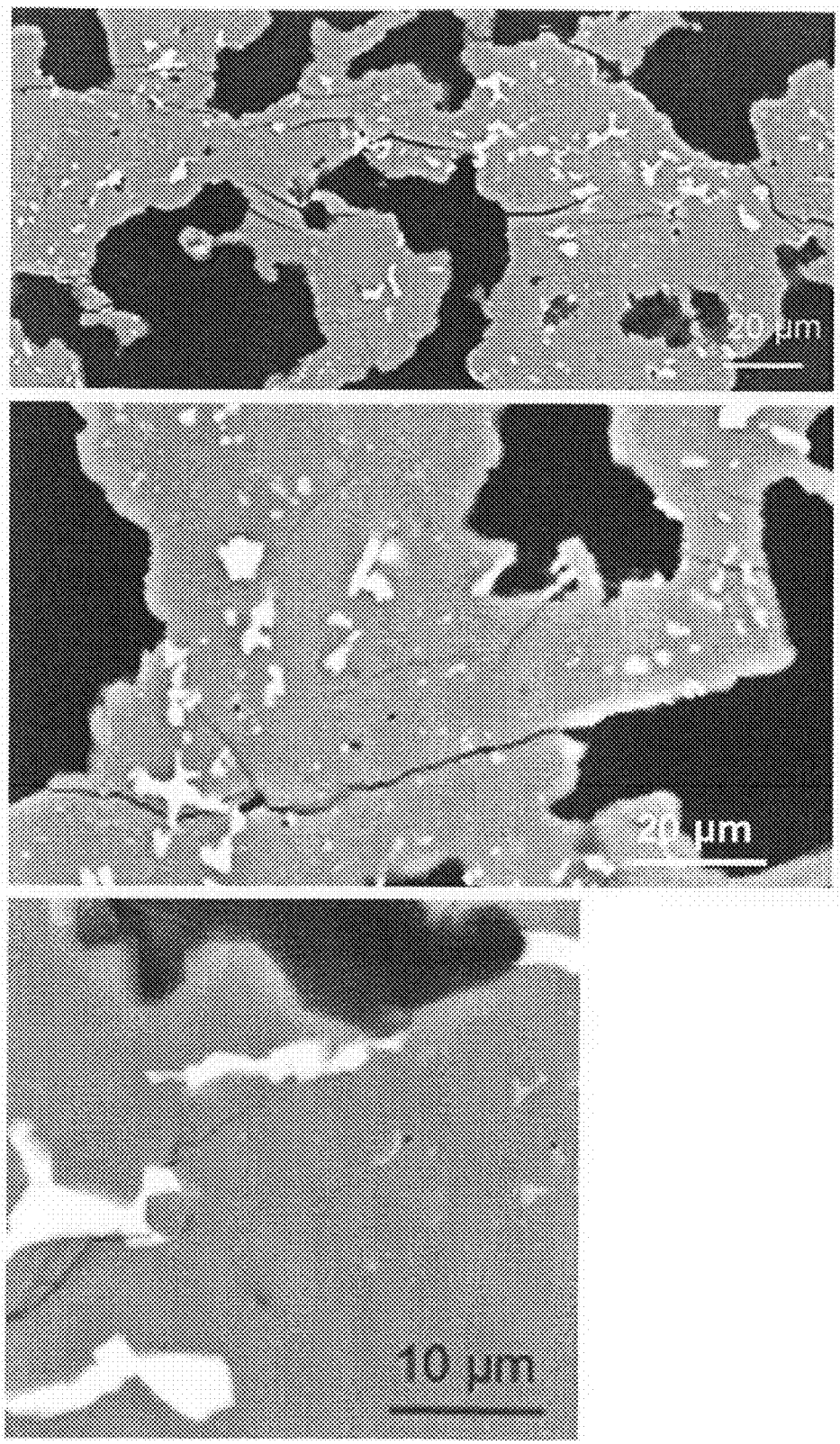
FIG. 14 is a set of SEM images illustrating the interaction of cracks with the dispersed precipitates in dispersion toughened type A material of the invention.

FIG. 14 is an SEM image illustrating the interaction of cracks with the dispersed precipitates in dispersion toughened type A material.

Figure 15:
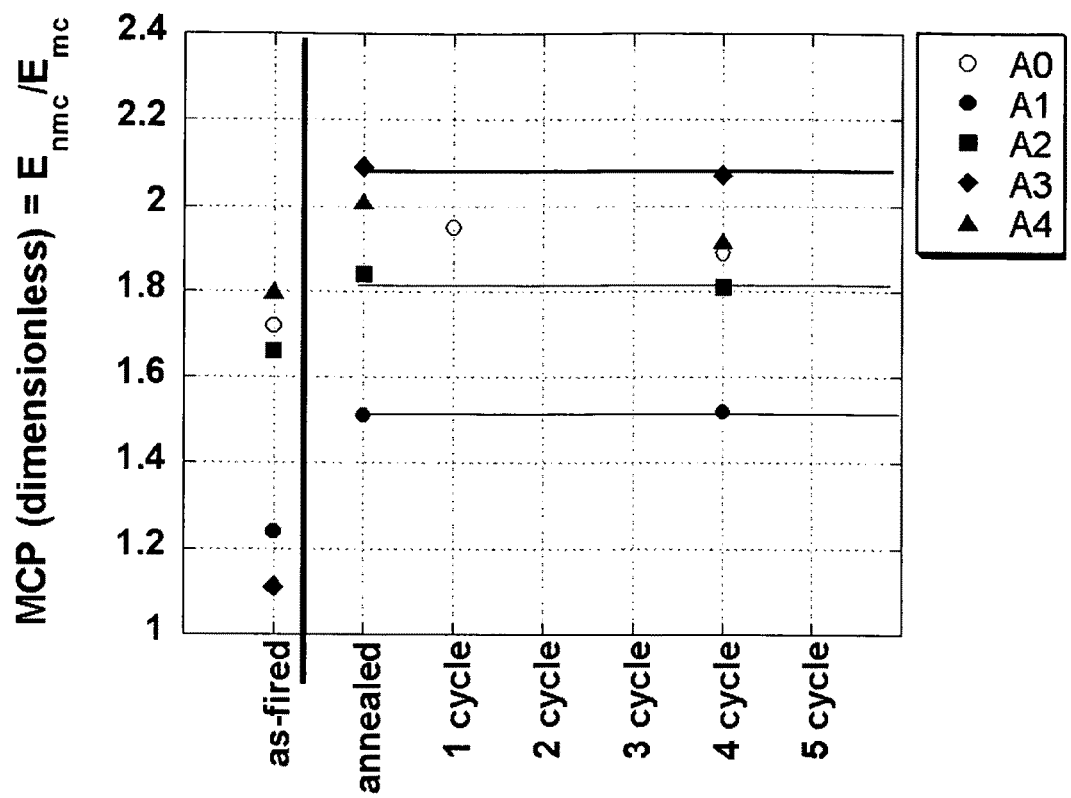
FIG. 15 is a plot of the microcrack parameter MCP for the comparative material A0 and inventive materials A1, A2, A3, and A4 after initial firing, annealing and cycling.

FIG. 15 is a plot for the comparative material A0 and inventive materials A1, A2, A3, and A4 of the microcrack parameter MCP after initial firing, annealing and cycling. MCP is an indicator of the microcrack network density. The plot shows that the presence of the precipitates after annealing stabilizes the microcrack density and keeps the microcrack density constant during temperature cycling. It can be seen that the microcrack density of the reference material A0 increases from as-fired to cycled state substantially, however, even this material with very small "natural" additive level can be stabilized through annealing. The figure shows further that different microcrack levels can be stabilized with the choice of additive and annealing.

Figure 16:
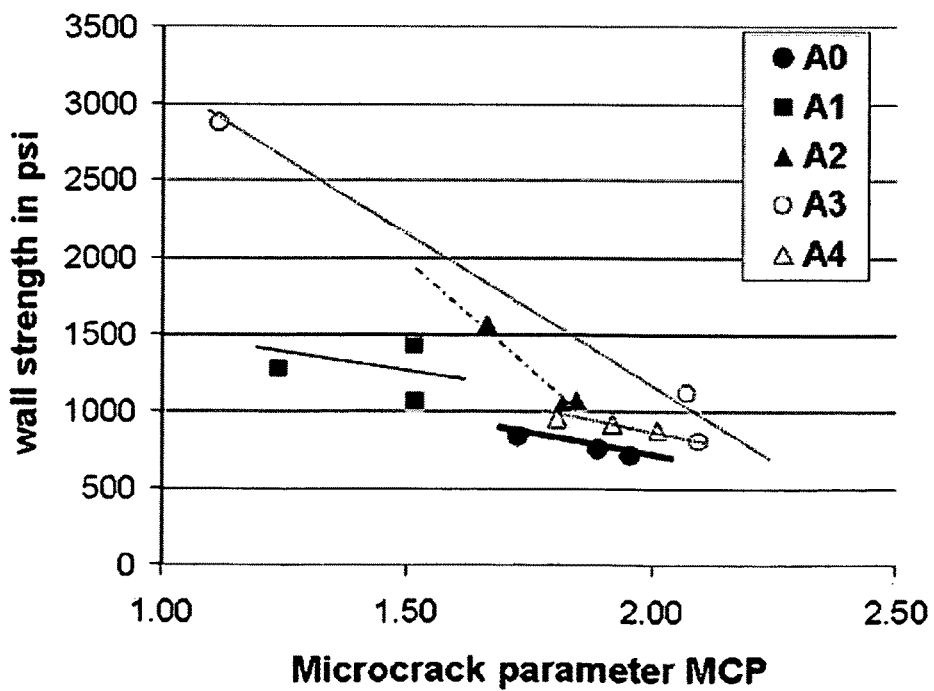
FIG. 16 is a plot of the wall strength as a function of microcrack parameter for the comparative material A0 and inventive materials A1, A2, A3, and A4.

FIG. 16 is a plot of the wall strength as a function of microcrack parameter, illustrating the trend that as expected low microcrack densities provide higher wall strength and that it is desirable to have materials with stable, low microcrack density as provided in the inventive examples.

Figure 17:
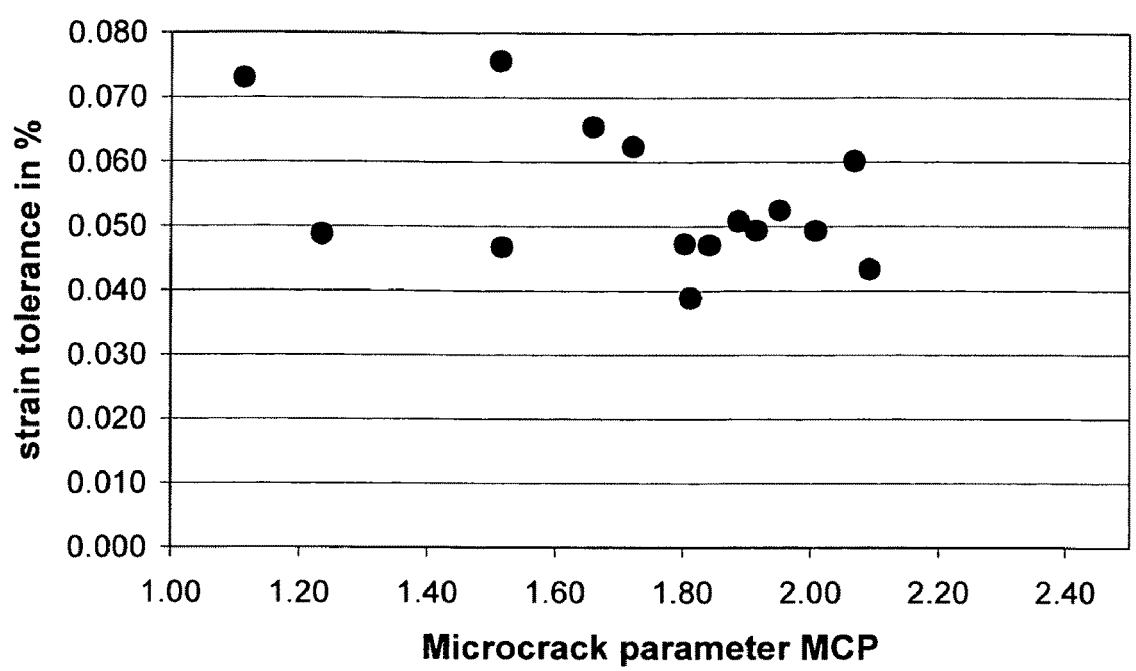
FIG. 17 is a plot of the strain tolerance as a function of microcrack density for the comparative material A0.

FIG. 17 is a plot of the strain tolerance as a function of microcrack parameter.

In one embodiment of the invention, during annealing, the glass, which is formed together with cordierite in the main cordierite formation firing step, is partially ceramized and the residual glass wets at least a portion of the interface between primary matrix phase and precipitated second phase. The interfacial glass films of the dispersed precipitate are not interconnected into a continuous glass network. At the annealing temperature, the microstructure is brought into a stress-free or low stress state. During cooling from the annealing temperature to room temperature, the precipitate undergoes stronger shrinkage than the cordierite matrix. As a result residual glass film that surrounds the precipitate is strained and precipitates and/or interfacial areas are strained. In a preferred embodiment, the strain is small enough to not lead to crack formation in the glass film or interface area. The residual stress level in the annealed ceramic after cooling to room temperature can be adjusted by the annealing temperature or the elastic modulus (glass composition) of the remaining glass that wets the precipitate or the elastic modulus of the precipitate itself (through precipitate chemical composition). During filter operation, the part is temperature cycled between a temperature lower than the annealing temperature and room temperature. During such thermal cycling, the precipitate and surrounding glass film are under tensile strain. If microcracks form or propagate in the cordierite ceramic during thermal cycling, those propagating microcracks interact preferentially with the strained area of the dispersed precipitates with their surrounding glass layer, propagate into and within the strained precipitate-glass-primary matrix interfacial area and produce toughening of the ceramic by interface debonding and crack deflection, creating highly tortuous crack paths.

The invention relates to a porous ceramic honeycomb including a first phase of microcracked cordierite material and a second phase of non-cordierite metal oxide particles dispersed in the cordierite ceramic. At least a portion of the interface between the first phase and second phase is wetted by a low elastic modulus glass film. The second phase of the porous ceramic substrate is present in an amount from about 0.2 to about 20 wt. %, preferably, from about 0.5 to about 5 wt. %, and more preferably, from about 1 to about 3 wt. % of the honeycomb material.

Dispersion-toughened cordierite is defined as a cordierite having non-cordierite particles dispersed in the cordierite ceramic, the particles serving to prevent or minimize the propagation of microcracks during thermal cycling and thermo-mechanical stress. The cordierite ceramic honeycomb wall strength is improved by the second phase dispersion by at least 10%, preferably 40%, more preferably 60%, and most preferably more than 100%. The dispersion-toughened cordierite ceramic honeycomb preserves its strain tolerance after some initial cycles during further thermal cycling and preferably has a strain tolerance of at least 0.05%. The dispersion-toughened cordierite ceramic honeycomb has at least the same strain tolerance as the dispersion-free material, more preferably, better by at least 20%, most preferably, better by at least 30%.

The dispersion-toughened cordierite materials meet the desired filter properties with high strength, low elastic modulus, low thermal expansion materials, high filtration efficiency and low pressure drop and, in addition, offer higher durability through improved fracture toughness. Following crystallization of the dispersed phase, the ceramic honeycomb has an average CTE value below $20 \times 10^{-7}$ $K^{-1}$, preferably below $12 \times 10^{-7}$ $K^{-1}$, and more preferably below $8 \times 10^{-7}$ $K^{-1}$, in the temperature range of from about 20° C. to about 800° C.

The dispersion-toughened cordierite materials in accordance with the present invention enable products that have a thermal shock resistance that is equal to or higher than the thermal shock tolerance of currently available cordierite-based products. Preferably, the ceramic honeycomb of the invention has an initial thermal shock resistance as good as a comparative non-dispersion toughened cordierite ceramic, and shows an improved fracture toughness that limits the growth of the microcrack network during extended thermal cycling to less than 20%, preferably to less than 10% and more preferably to less than 5%. During thermal cycling, the ceramic honeycomb preferably preserves high strain tolerance and low thermal expansion. The dispersion-toughened cordierite honeycomb materials of the present invention can be used for both, filter and substrate applications.

Use of glass-forming additives in the present formulation also provides the commercial advantage of lowering firing temperature and/or shortening firing time.

During the annealing, the glass partially crystallizes, and a ceramic is obtained that is composed of the primary phase matrix and a dispersion of a secondary phase. The primary phase matrix and the secondary phase precipitates are separated by an interface. The second phase precipitates (particles) are preferably partially or fully wetted by residual glass. An interface is considered wetted by glass if a layer of glass is present in at least a portion of the interface. Preferably, the interface is wetted by glass having a layer thickness in the range from about 0.3 nm to about 0.3 μm. The secondary phase and the glass have typically a higher thermal expansion than the primary matrix phase. Preferably the glass has a lower elastic modulus than the primary and secondary phases, which is the case for the additives disclosed herein. The interface between the primary phase matrix and the crystalline second phase contains a thin glass film that wets at least a portion of the crystalline second phase when the glass is not fully ceramized. Wetting is a result of energy minimization. In an isotropic system, the matrix-precipitate interface is wetted by the residual glass if that configuration offers an energy advantage compared to the configuration containing a glass-free interface and a glass pocket in the matrix. Thermodynamic considerations of wetting in anisotropic systems as considered in the current invention predict that, depending on the specific crystallographic orientation and structure of the interface and its interface energy, certain portions of the interface in such system are wetted, other portions are not. As a consequence, the ceramic with second phase dispersion of the current invention is expected to contain precipitates that are fully or partially (a portion of their surface) wetted with a glass film that varies in thickness depending on the interface facet.

The ceramic honeycomb of the invention can be formed into a product having high durability, wherein the microcrack density established after several initial cooling/heating cycles does not substantially increase after undergoing additional cooling/heating cycles. The cordierite materials of this invention have a microcrack network density described by a microcrack parameter MCP. Preferably the MCP is in the range from about 1.2 to about 2.2.

The ceramic honeycomb material preferably has a median pore size in the range from about 10 to about 20 μm. The pore size distribution is narrow, preferably having a d-factor in the range from about 0.3 to about 0.5. The d-factor is defined as d-factor=(d50-d10)/d50. The ceramic substrate of the invention has a porosity of at least about 45%.

In accordance with the processes of the present invention, improved thermal shock resistance of cordierite honeycomb ceramics is achieved by dispersion-toughening. The porous microcracked cordierite honeycomb can be toughened according to a process which includes forming as a first phase a cordierite composition and adding to the cordierite composition at least one non-cordierite forming metal oxide or metal oxide precursor that contributes to the formation of the second dispersed phase. Dispersion-toughened cordierite can be processed in the same way as traditional cordierite products and extruded into a honeycomb shape. In order to facilitate a homogeneous distribution of the toughening second phase particles, a homogeneous distribution of the dispersion-forming additives in the greenware is preferably accomplished by adding the additives as dissolved salts, gel or suspension to the batch water. The preferred additives are glass-formers.

The composition is mixed and then shaped or formed into a green body. The green body is fired. During the reactive sintering, the additives induce formation of glass between the cordierite grains. The sintering preferably includes an initial firing to a maximum temperature of from about 1350° C. to about 1430° C. with hold, in which the cordierite and glass phase are formed. Following the initial firing, the material is annealed and cooled to form a toughened cordierite ceramic having a second phase of non-cordierite particles dispersed in the cordierite ceramic. The fired green body is annealed at a temperature below the firing temperature to form a toughened cordierite ceramic honeycomb having dispersed second phase crystalline particles wetted by a glass film within the cordierite first phase at least in a portion of the interface between the cordierite matrix and the second phase. The annealing step is used to partially crystallize the glass pockets into a dispersion of small ceramic particles with residual glass partially or fully wetting the cordierite-second phase interface. Preferably, the annealing step is carried out at a temperature in the range from about 900° C. to about 1250° C. Preferable annealing time at that temperature range is at least 1 hour, more preferably, several hours. The annealing can be carried out by cooling the fired green body to a temperature below the annealing temperature, e.g. room temperature, and then heating the green body to the annealing temperature to crystallize the non-cordierite second phase particles. Alternately, the annealing can be carried out by cooling the fired green body to the annealing temperature and holding at that temperature to crystallize the non-cordierite second phase particles. Still another alternative is to cool the sample very slowly through the annealing temperature range to room temperature.

Optimum precipitate dispersions are preferably made as homogeneous as possible, with precipitate size ranges from submicron to several micrometers. The second phase particles preferably have a size in the range of from about 0.1 to about 10 μm, more preferably, from about 0.3 to about 3 μm, and most preferably, from about 0.5 to about 1 μm.

Materials suitable as second phase particles include materials compatible with cordierite, and additives that are glass-forming with cordierite constituents at temperatures between about 1200° C. and about 1430° C. and then crystallize into dispersed precipitates. Typically, the materials suitable for the toughening dispersed phase have a CTE different from the CTE of the first phase cordierite materials and have a low elastic modulus or have a low elastic modulus interface layer. Different types of materials can also be used for toughening. Suitable materials include very soft materials that absorb energy for plastic deformation, such as metallic copper, gold or silver. Suitable materials also include materials that stop crack propagation in the matrix by energy dissipation for microcracking, crack branching and deflection, such as aluminum titanate, iron titanate or tungsten oxides, cristobalite films, sheet silicates and others. Further suitable materials include materials that undergo phase transformation under volume expansion, such as partially stabilized zirconia. Materials that preserve an interconnected glass network are not suitable because they provide continuous easy paths for crack propagation.

Preferably, the second phase is composed of non-cordierite metal oxide particles. Suitable metal oxides include $(RE)_2Si_2O_7$, where RE stands for rare earth metals. More preferably, RE are mixtures of Y, Yb, Sm, Er, La and Lu. Suitable metal oxides also include titanates that include transitional metals, preferably Fe, Ni, Co, or Mn and alkaline earth metals, preferably Al, Mg, Sr, Si, Ca, and Ba; zircon; and solid solutions of mixed metal oxides or silicates. The second phase may consist essentially of the non-cordierite metal oxide particles, but also contain minor amounts of oxide dopants which generally come from the cordierite batch materials, including elements such as Mg, Ni, Al, Si, Fe, and Ca.

In FIG. 1, schematized microstructures of precipitate toughened and comparative non-toughened microcracked ceramic are shown before and after application of thermomechanical stress to illustrate the evolution of the inventive and comparative microstructures under stress.

Comparative microcracked ceramic (FIG. 1A) without any second phase particles for toughening, shows as response to thermal cycling or applied mechanical stress the regular crack reopening and some crack growth, that over time can lead to the association of some cracks and final failure by macrocracks.

Comparative microcracked ceramic (FIG. 1B) with a continuous glassy grain boundary film (without second phase dispersion) shows enhanced crack propagation through the continuous fragile glass phase along the glass-wetted cordierite grain boundaries and provides extended crack growth. This configuration is undesirable and provides even less fracture toughness than the microcracked ceramic (FIG. 1A) and should be avoided.

Microcracked ceramic (FIG. 1C) of the present invention shows toughening by debonding of the weak interfaces that surround dispersed precipitates of the second phase. The interfaces of the second phase particles were stress-relaxed at the annealing temperature and are strained in application during thermal cycling. Tensile strain is largest in the interfacial area between cordierite phase and second phase. Second phase particles wetted by an interfacial glass film show the weakest interfacial area, and due to the tensile strain in their interfacial area interact more strongly than the rest of the surrounding ceramic with propagating microcracks and attract them. Energy dissipation occurs by debonding of the interface of the dispersant particles along the strained interfacial film, preferentially through the interfacial glass film. Thus, crack growth and interconnection of cracks is slowed down, and formation of macrocracks retarded.

Microcracked ceramic (FIG. 1D) of the present invention shows toughening of a microcracked ceramic by very easy microcracking dispersed second phase precipitates. Microcracking energies of the second phase are much lower than that of cordierite.

Microcracked ceramic (FIG. 1E) of the present invention shows toughening of a microcracked ceramic by soft dispersed precipitates of a second phase that absorb energy for plastic deformation. Energy dissipation during thermal cycling or other mechanical stress exposure preferentially induces plastic deformation of the dispersant particles. Thus, crack growth and the interconnection of cracks is slowed down, and formation of macrocracks retarded.

Microcracked ceramic (FIG. 1F) of the present invention shows toughening of a microcracked ceramic by phase transformation and associated volume increase of the dispersed second phase precipitate. Energy dissipation during thermal cycling or other mechanical stress occurs by the phase transformation of dispersed second phase particles. If the phase transformation is associated with a volume increase, it stops the propagation of the crack. Thus, crack growth and interconnection of cracks is slowed down, and formation of macrocracks retarded.

The following are examples of cordierite with dispersions of $(Y, Al)_2Si_2O_7$, (Fe, Al, Mg)-titanates, and zircon. The examples shown below are illustrative and not meant to limit the general principle of the present invention.

TABLE 1

Type A batch compositions:

| Additive precursor | Ratio | Super-addition of additives in % | Silica % | Alumina % | Kaolin % | Talc % | Alumina, hydrate % | Pore former Corn starch % |
|---|---|---|---|---|---|---|---|---|
| A0 no (reference) | | 0 | 12.55 | 12.75 | 13.57 | 35 | 13.72 | 12.7 |
| A1 titanium tetra chloride | | 2 | 12.55 | 12.75 | 13.57 | 35 | 13.72 | 12.7 |
| A6 titanium tetra chloride and ferric citrate | 1:1 Fe:Ti | 2 | 12.55 | 12.75 | 13.57 | 35 | 13.72 | 12.7 |
| A2 titanium tetra chloride and ferric citrate | 2:1 Fe:Ti | 2 | 12.55 | 12.75 | 13.57 | 35 | 13.72 | 12.7 |
| A4 yttrium nitrate and alumina (Al-20) | 3:5 Y:Al | 2 | 12.55 | 12.75 | 13.57 | 35 | 13.72 | 12.7 |
| A3 yttrium nitrate and ludox (AS 40% Silica) | 1:1 Y:Si | 2 | 12.55 | 12.75 | 13.57 | 35 | 13.72 | 12.7 |
| A5 zirconyl nitrate and ludox (AS 40% Silica) | 1:1 Zr:Si | 2 | 12.55 | 12.75 | 13.57 | 35 | 13.72 | 12.7 |

TABLE 2

Type B batch compositions:

| Super-Additive | Magnesia % | Silica % | Alumina % | Potato starch % |
|---|---|---|---|---|
| B0 1% $Y_2O_3$ + 2% $SiO_2$ | 11.96 | 44.75 | 30.25 | 13 |
| B1 1% $Y_2O_3$ + 2% $Al_2O_3$ | 11.96 | 44.75 | 30.25 | 13 |
| B3 3% $La_2O_3$ | 11.96 | 44.75 | 30.25 | 13 |
| B4 3% $Y_2O_3$ | 11.96 | 44.75 | 30.25 | 13 |
| B5 3% $TiO_2$ | 11.96 | 44.75 | 30.25 | 13 |
| B6 1% $Fe_2O_3$ + 2% $TiO_2$ | 11.96 | 44.75 | 30.25 | 13 |
| B7 3% $ZrO_2$ | 11.96 | 44.75 | 30.25 | 13 |

* Methocel was added as binder, and batch water was added in levels to obtain suitable extrudability of the batch.

The additives of Table 2 were added in the form of oxide powders to the Type B cordierite batch mixture during dry mixing. For the Type A cordierite batches, the additives were added in the form listed in Table 1, to the batch water during mulling.

Dry ingredients were added to a mulling pan. The pan was put in the mulling machine and turned on. Slowly, batch water solution was added to the muller mixture, until the texture was that of suitable paste for extrusion that would be appreciated by everybody being familiar with the art.

A RAM extruder was used for extruding the paste into spaghetti in a first and second run in order to improve the uniformity and plasticity of the batch material. The paste was then extruded into a honeycomb shape with a honeycomb die and shim of appropriate size.

After extrusion the greenware was dried in air at a temperature of 70 to 90° C.

Parts were fired in a furnace in air using a heating rate of from 120° C./h to 1390° C. to 141° C., a hold for 15 hours and cool down at 120° C./h. In the annealing step, parts were heated with ramp rate of 120° C./hour to a temperature of 900 to 1250° C., held 2 to 15 hours and cooled with the same cooling rate. FIG. 2 shows exemplary firing cycles to be used for the main firing for the formation of cordierite and glass and for the annealing, in which the glass is partially or fully precipitated. In the examples, a firing cycle as shown by the solid line was used, in which the samples were cooled to room temperature prior to the annealing.

The material microstructure of cordierite with additives both before and after ceraming of the glassy phase is illustrated by FIG. 3. The microstructure of a cordierite-based ceramic obtained with yttria as additive shows after the initial firing a large fraction of glassy pockets of a yttrio-silicate. Substantial crystallization and partial/full dewetting of the triple pockets and grain boundaries is achieved by the annealing. The annealed ceramic contains crystalline $Y_2Si_2O_7$ precipitates that are surrounded by residual glass. Both $Y_2Si_2O_7$ and residual glass have a larger thermal expansion than cordierite. $Y_2Si_2O_7$ is harder than cordierite, the glass has a lower elastic modulus FIG. 3 shows the microstructure of Type B cordierite batch with 3% yttria addition after initial firing at 1420° C. (left side picture), with pockets of yttrium silicate glass; and in the right side picture, the SEM image shows the microstructure of the material after annealing at 1200° C. for 4 hours with a fine dispersion of $Y_2Si_2O_7$ and a low amount of residual glass. More complete devitrification is achieved when the exact composition of the crystallized phase is matched by the batch composition by adding yttria and silica as super addition and the annealing conditions are optimized.

The following phases were identified by X-ray diffraction after annealing: (Mg, Al, Fe)-titanates, in batches with addition of titania or titania and alumina and/or iron oxide, $(Y,Al)_2Si_2O_7$ in batches with addition of yttria or yttria and silica or yttria and alumina, $ZrSiO_4$ in batches with addition of zirconia or zirconia and silica surrounding the precipitates.

Properties of the dispersion-toughened ceramics were compared to corresponding ceramics produced without the dispersion-toughened process. Two different cordierite filter compositions were chosen for demonstrating the dispersion toughening of cordierite, Type A batch and Type B batch. Details on composition, processing and firing are shown in the above sections. The properties of the materials were evaluated after the initial firing, with some limited optimization of firing temperature and time, and after annealing. In a set of initial experiments, annealing temperature and time were varied to determine the best annealing conditions for a stable microstructure. The annealing condition of 4 hours at 1200° C. provided for all studied compositions full ceramization and a stable microstructure.

The microstructure of the inventive ceramics was studied after the cordierite (and glass) forming firing cycle (1), after annealing (2) and after exposing the annealed ceramics to 4 further temperature cycles (3) from room temperature to 1200° C. Standard scanning electron microscopy, SEM, characterization was conducted on polished honeycomb cross sections (cut perpendicular to the honeycomb channels, infiltrated with epoxy, sliced and polished). Chemical compositions of the different phases and elemental distributions were obtained by energy dispersive X-ray spectroscopy on the SEM and by quantitative microprobe analysis.

The pore size distribution in inventive and exemplary honeycomb materials was determined with a mercury intrusion porosimeter. An Autopore IV 9500 porosimeter was used for mercury intrusion porosimeter. This method uses the capillary law with non-wetting liquid and cylindrical pores. It is typically expressed with the Washburn equation $D=-(1/P)4y\cos\varnothing$, where D is the pore diameter, P is the applied pressure, y is the surface tension and $\varnothing$ is the contact angle. The volume of mercury is directly proportional to the pressure. The software was made by Micromeritics. Data reduction uses the differential and log differential to calculate the first derivative of the cumulative specific intrusion volume as a function of calculated log diameter of the pore size. The table presents median pore size d50, but also other characteristics of the pore size distribution, such as di with i=1, 2, 5, 10, 25, 75, 90, 95, 98, 99. The table also shows characteristic width of the pore size distribution (d90−d10)/d50 and also (d50−d10)/d50.

Thermal expansion was measured for bar-shaped samples with dimension 0.25"×0.25"×"2" during heating from room temperature to 1200° C. at a rate of 4K/min and subsequent cooling to room temperature. For the data reported in the property table, the long axis of the test bars was oriented in the direction of the honeycomb channels, thus providing the thermal expansion in the axial direction of the honeycomb parts. Average thermal expansion coefficients for various temperature ranges are recorded in the property table, $CTE_{25-800}$ in $K^{-1}$, the average thermal expansion coefficient from room temperature to 800° C., defined as L(800° C.)-L(25° C.)/775K as average thermal expansion coefficient in the temperature range from room temperature to 800° C., $CTE^{500-900}$ in $K^{-1}$, the average thermal expansion coefficient from 500 to 900° C., defined as (L(900° C.)-L(500° C.))/400K as average thermal expansion coefficient in the temperature range from 500° C. to 800° C. $CTE^{500-900}$ is of particular importance for the application of honeycomb parts in the exhaust after-treatment in the automotive vehicle, where the honeycomb part is subjected to severe rapid temperature changes and where the temperature range from 500-900° C. would match a frequently encountered operation temperature range.

Characteristics of the honeycomb geometry are the cell density, in the table indicated in cells per $inch^2$, and the wall thickness, in the table indicated in mil (1 mil=0.001 inch). The closed frontal area of a honeycomb, CFA, corresponds to the total honeycomb section minus the area of the pore channels; it can be derived for a given test bar or honeycomb sample from the size of the test bar, the number of honeycomb cells per area and the honey comb wall thickness.

The ceramic strength was tested using a transverse bending technique where test specimens were loaded to failure in using either three or four bending points. The maximum stress prior to failure is the modulus of rupture or MOR. Strength values (4-point flex. MOR) have been measured using four point flexure with a lower span (L) of two inches and an upper span of three quarters of an inch. The property table reports MOR in psi as measured by 4-point flexure on specimens with geometry two and one half inches in length, one half inch in width and one quarter inch thick. The force-measuring system used was equipped with a read-out of the maximum force and a calibrated load cell. The MOR value was calculated using the well known flexure strength equation $MOR_{(4\text{-}point\ bending)}=[\frac{3}{4}\cdot P\cdot L/(b\cdot d^2)]$, where P is the maximum force, L is the lower span length, b is the width of the test bar and d is the thickness of the test bar.

$MOR_{(4\text{-}point\ bending)}$ does not account for the specimens square cellular (honeycomb) with the channels in the direction of the length. If m is the number of cells in the width direction, n is the number of cells in the thickness direction, t is the wall thickness and p is the cell pitch, the actual material strength, the wall strength, is derived by accounting for the cellular structure (according to reference J. E. Webb, S. Widjaja, J. D. Helfinstine, "Strength Size Effects in Cellular Ceramic Structures," Ceramic Engineering and Science Proceedings—Mechanical Properties and Performance of Engineering Ceramics II, Volume 27, Issue 2 (November 2006), pp. 521-531)) as wall strength $\sigma_{wall}=[P\cdot L\cdot d/(16\cdot l_t)]$ with $l_t$ being $$l_t = \frac{bd^3}{12} - \left[\frac{mn(p-t)^4}{12} + \frac{mp^2(p-t)^2}{4}\sum_{i}^{n}(2i-n-1)^2\right].$$

Bar-shaped samples with dimension 5"×0.5"×0.25" and the long axis being oriented in the direction of the honeycomb channels were used to measure the elastic modulus by flexural resonance frequency. Samples were heated to 1200° C. and cooled back to room temperature. For each temperature the elastic modulus was directly derived from the resonance frequency and normalized for sample geometry and weight by referring to ASTM C 1198-01.

The elastic modulus of a microcracked ceramic is lower than that of the corresponding non-microcracked ceramic. The elastic modulus obtained in a heating and a cooling cycle for microcracked ceramics shows an extensive hysteresis that is related to the fact that during heating to temperatures above about 700° C. microcracks in the material start to close, which yields an increase in the elastic modulus during heating in the temperature range from about 700° C. to 1200° C. At around 1200° C., microcracks are typically closed in most cordierite materials, and a non-microcracked ceramic is obtained. In the cooling cycle from 1200° C. to room temperature, the elastic modulus curve follows initially that of the non-microcracked ceramic, characterized by a straight line with a slightly negative slope, the slope of which is determined by the intrinsic elastic modulus of the cordierite ceramic with the contributions of the secondary phases. When a critical local stress is reached during cooling, microcracks start to form during further cooling. The onset of microcracking during cooling is observed in the elastic modulus cooling curve for temperatures below 500° C. The elastic modulus then decreases with decreasing temperature, reflecting increasing microcracking. At room temperature, the elastic modulus of the cooling curve finally reaches the original starting value of the heating curve, which is the room temperature elastic modulus of the microcracked ceramic $E_{mc}^{RT}$. An imaginary elastic modulus of the non-microcracked ceramic at room temperature, $E_{nmc}^{RT}$ can be derived from the straight portion of the cooling curve in the temperature range from 600° C. to 1000° C. by extrapolating the straight line to room temperature, $E_{nmc}^{RT}=E^{1000C}-975\cdot(E^{1000C}-E^{600C})/400$. The degree of hysteresis between the heating and cooling elastic modulus curves reflects the microcrack density of the material at room temperature. The microcrack density is proportional to the ratio of the elastic modulus of the microcracked material $E_{mc}^{RT}$ and the (virtual) modulus of the corresponding non-microcracked material $E_{nmc}^{RT}$. A parameter MCD, defined as $MCD=E_{nmc}^{RT}/E_{mc}^{RT}$, is used as measure for the microcrack network density. MCD=1 for non-microcracked ceramics, MCD is small for cordierite with low microcrack density (typically MCD<1.5) and MCD>2 for strongly microcracked ceramics. The data table presents MCD values for the different materials.

For cordierite ceramics that contain significant levels of secondary glass phase, a decrease in elastic modulus is observed with heating to temperatures where the glass starts to undergo plastic deformation. Such plastic deformation makes that starting point of heating curve and end point of cooling curve not coincide. This can be seen in curves Ai-(1) of FIGS. 5-9b for temperatures>1100° C. If an increase in microcrack density occurs during the thermal cycle as for the initially non-microcracked cordierite ceramics with yttria addition in FIG. 8b, the starting point of heating and end point of cooling curve do not coincide.

A strain tolerance can be derived from the strength of the material and its elastic modulus. This strain tolerance describes the ability of a material to handle strain. The higher the strain tolerance, the less likely the material will fracture. The property table lists strain tolerance $ST^{RT} = \sigma_{wall}^{RT}/E_{mc}^{RT}$, ST is dimension-less.

The resistance to thermal shock is an important parameter for a honeycomb part meant for automotive exhaust aftertreatment because the part undergoes severe thermal cycling during rapid heat up and cool down. The thermal shock resistance of a honeycomb is expected to improve with high strength, low elastic modulus and low thermal expansion of its material. In the present invention, the precipitate dispersion helps to provide high toughness to the part and reduce the propagation of cracks and formation of macrocracks.

EXAMPLE 1

Type A Cordierite Compositions with Additives

Results on properties of 1" honeycomb extruded parts with cell geometry 200 cells/1 sq. inch and 16 mil wall thickness, (200/16), are shown in Table 3 for initially fired (black) and annealed Type A cordierite with super-additions of 2% total of $Y_2O_3+SiO_2$, $Y_2O_3+Al_2O_3$, $Fe_2O_3+TiO_2$, $TiO_2$ as indicated in Table 3 and compared to the properties of Type A reference material. The required temperatures for the initial firing of materials with additives are lower than that of the Type A reference. The main results can be summarized as follows. Materials with the above described super-additions require lower temperature for firing. The intermediate strength of the Type A batches with super-additives are at least the same (addition of Y+Si=1:1), higher (Y+Al) or almost doubled (case of Ti-additions) during firing of the green ware in the temperature range from 400-800° C. The fully fired materials with the super-addition reach all similar porosity (around 50%) and average pore size (14 to 19 micrometer) and exhibit a smaller d-factor $d_f$. The type A reference material shows a $d_f=0.51$; the best inventive type A materials was obtained from the batch with addition of yttria, it shows a d-factor of $d_f=0.3$.

Thermal expansion curves of type A-materials with additives are shown in FIGS. 5-9. The average thermal expansion coefficient from room temperature to 800° C., $CTE^{RT-800C}$ for the Type A reference material fired at 1410° C. is $6.1 \times 10^{-7} K^{-1}$. Similarly low CTE is obtained with addition of yttria and alumina. The initially fired material with glassy second phase has a CTE of $6.3 \times 10^{-7} K^{-1}$ and reaches after annealing a lower CTE than the reference with $3.1 \times 10^{-7} K^{-1}$. Type A material with addition of yttria and excess silica yields after the initial firing the rather high CTE of $15.8 \times 10^{-7} K^{-1}$ of a non-microcracked cordierite, after crystallization of $Y_2Si_2O_7$, the CTE is close to that of the Type A reference of $5.7 \times 10^{-7} K^{-1}$. The materials obtained with addition of titania or titania and iron oxide exhibit higher CTE after initial firing and after the annealing compared to the reference material.

Microcrack densities were derived from the E-modulus heating and cooling curves in FIGS. 5-9. After the initial firing, the Type A reference material has a microcrack network characterized by the microcrack parameter MCP=1.72. The microcrack network grows during the annealing treatment, to MCP=1.95.

As already indicated by the CTE, some of the materials have a lower microcrack network density. Type A material with addition of yttria and silica is after the initial firing non-microcracked. Only upon annealing, it does develop microcracks, reaching a stable microcrack network density with MCP=2.1. Materials with addition of titania have a lower microcrack density. Type A material with titania addition exhibits a microcrack parameter of MCP=1.24 after firing and MCP=1.5 after annealing and temperature cycling. Type A material with titania and iron oxide exhibits MCP=1.66 after firing and MCP=1.8 after annealing and temperature cycling. The addition of yttria and alumina leads to a microcrack parameter of MCP=1.8 after firing and 2.0 after annealing. FIG. 15 is a plot of the microcrack parameter MCP for the materials A0, A1, A2, A3, A4 after initial firing, annealing and cycling. MCP is an indicator of the microcrack network density. The plot shows that the presence of the precipitates after the annealing stabilizes the microcrack density and keeps it constant during temperature cycling. It can be seen that the microcrack density of the reference material A0 increases from as-fired to cycled state substantially, however, even this material with very small "natural" additive level can be stabilized through annealing. The figure shows further that different microcrack levels can be stabilized with the choice of additive and annealing.

The wall strength for fired, annealed and cycled materials is illustrated in FIG. 4. Compared to the Type A reference with a wall strength of around 843 psi after firing and 750 psi after cycling to 1200° C., significant improvement in strength was obtained in the dispersion toughened A-type cordierite. The highest strength was achieved with the non-microcracked material with yttria and silica addition after the initial firing; this material developed microcracks during annealing and part of its initial advantageous high strength was lost, achieving 800-1000 psi. Stable microcrack density and stable strength of >1050 psi was obtained by addition of titania or its combination with alumina for all materials after firing, annealing and cycling. FIG. 16 is a plot of the wall strength as a function of microcrack parameter, illustrating that low microcrack densities provide higher wall strength and that it is desirable to have materials with stable, low microcrack density. The plot illustrates again the advantage of the dispersion-toughened materials of this invention compared to the non-toughened material A0.

FIG. 17 is a plot of the strain tolerance as a function of microcrack parameter, showing that there is no direct correlation and that low microcrack network density is not necessarily a pre-requisite for high strain tolerance.

The thermal shock factor TSF shows similar or slightly improved values for the dispersion-toughening annealed materials compared to the Type A annealed reference.

The results on the microcrack density show that nature and also concentration of the second phase dispersion can be used to establish a desired microcrack density and that stable microcrack densities can be obtained at very different microcrack density levels that in such examples cover MPS=1.5 to MPS=2.1. The strength of the dispersion-toughened materials is higher than that of the Type A reference; in the best case, it is doubled.

TABLE 3

Properties of Type A materials with additives after initial firing and after annealing treatment at 1200° C., 4 hours.

| | A0-(1) | A0-(2) | A0-(3) | A1-(1) | A1-(2) | A1-(3) | A2-(1) | A2-(2) |
|---|---|---|---|---|---|---|---|---|
| Firing temperature (° C.) | 1415 | 1415 | 1415 | 1395 | 1395 | 1395 | 1390 | 1390 |
| Hold time (h) | 15 | 15 | 15 | 15 | 15 | 15 | 15 | 15 |
| post-annealing temperature (° C.) | | 1200 | 1200 | | 1200 | 1200 | | 1200 |
| post-annealing time (h) | | 4 | 4 | | 4 | 4 | | 4 |
| number of cycles 25C-1200C | | 1 | 5 | | 1 | 5 | | 1 |
| Cell Density (inch$^{-2}$) | 200 | 200 | 200 | 200 | 200 | 200 | 200 | 200 |
| Wall Thickness (10$^{-3}$ inches) | 16 | 16 | 16 | 16 | 16 | 16 | 16 | 16 |
| CFA | 0.401 | 0.401 | 0.401 | 0.401 | 0.401 | 0.401 | 0.401 | 0.401 |
| % Porosity | 53.35 | 52.10 | | 51.6308 | 48.19 | | 49.7334 | 49.8728 |
| d1 (um) | 4.84 | 3.07 | | 4.80 | 3.66 | | 2.83 | 2.23 |
| d2 (um) | 5.56 | 4.36 | | 6.14 | 5.64 | | 4.80 | 3.23 |
| d5 (um) | 7.19 | 6.02 | | 7.45 | 7.06 | | 6.60 | 5.79 |
| d10 (um) | 8.76 | 8.05 | | 8.72 | 8.28 | | 7.66 | 7.76 |
| d25 (um) | 12.16 | 11.86 | | 11.52 | 11.08 | | 10.19 | 10.93 |
| d50 (um) | 17.33 | 17.48 | | 16.52 | 15.74 | | 14.42 | 16.13 |
| d75 (um) | 24.62 | 25.46 | | 25.10 | 23.57 | | 20.00 | 23.38 |
| d90 (um) | 40.89 | 42.39 | | 45.62 | 43.79 | | 33.95 | 39.72 |
| d95 (um) | 65.13 | 66.17 | | 73.72 | 71.50 | | 55.77 | 65.50 |
| d98 (um) | 124.15 | 117.37 | | 131.11 | 135.42 | | 106.37 | 120.06 |
| d99 (um) | 188.83 | 175.28 | | 185.23 | 199.89 | | 158.77 | 182.46 |
| (d50 − d10)/d50 | 0.49 | 0.54 | | 0.47 | 0.47 | | 0.47 | 0.52 |
| (d90 − d10)/d50 | 1.85 | 1.96 | | 2.23 | 2.26 | | 1.82 | 1.98 |
| CTE$^{25-800°}$ C. (10$^{-7}$ K$^{-1}$) | 6.2 | 4.9 | 3.1 | 13.1 | 11.7 | 10.4 | 13.6 | 12 |
| CTE$^{500-800°}$ C. (10$^{-7}$ K−1) | 14.2 | 17 | 11 | 17.5 | 17.9 | 18 | 21 | 12.5 |
| MOR$^{25° C.}$ (psi) | 386 | 329 | 345 | 584 | 652 | | 716 | 491 |
| $\sigma_{wall}^{25° C.}$ (psi) | 843 | 719 | 754 | 1276 | 1425 | | 1564 | 1073 |
| $E_{mc}^{25° C.}$ (10$^5$ psi) | 5.42 | 5.49 | 5.95 | 10.5 | 7.55 | 9.11 | 9.59 | 9.13 |
| $E^{800° C.}$ (10$^5$ psi) | 8.95 | 10.2 | 10.8 | 12.4 | 11 | 13.1 | 15.2 | 16.1 |
| $E^{1000° C.}$ (10$^5$ psi) | 8.68 | 9.84 | 10.5 | 12 | 10.7 | 12.6 | 14.7 | 15.6 |
| $E_{nmc}^{25° C.}$ (10$^5$ psi) | 9.34 | 10.72 | 11.23 | 12.98 | 11.43 | 13.82 | 15.92 | 16.82 |
| MCP = $E_{nmc}^{25° C.}/E_{mc}^{25° C.}$ | 1.72 | 1.95 | 1.89 | 1.24 | 1.51 | 1.52 | 1.66 | 1.84 |
| ST = ($\sigma_{wall}^{25° C.}$ CFA/($E_{mc}^{25° C.}$)) in % | 0.062 | 0.053 | 0.051 | 0.049 | 0.076 | | 0.065 | 0.047 |
| TS = 500 + ST/CTE$^{500-800°}$ C. | 939 | 809 | 962 | 778 | 923 | | 812 | 877 |

| | A2-(3) | A3-(1) | A3-(2) | A3-(3) | A4-(1) | A4-(2) | A4-(3) |
|---|---|---|---|---|---|---|---|
| Firing temperature (° C.) | 1390 | 1390 | 1390 | 1390 | 1390 | 1390 | 1390 |
| Hold time (h) | 15 | 15 | 15 | 15 | 15 | 15 | 15 |
| post-annealing temperature (° C.) | 1200 | | 1200 | 1200 | | 1200 | 1200 |
| post-annealing time (h) | 4 | | 4 | 4 | | 4 | 4 |
| number of cycles 25C-1200C | 5 | | 1 | 5 | | 1 | 5 |
| Cell Density (inch$^{-2}$) | 200 | 200 | 200 | 200 | 200 | 200 | 200 |
| Wall Thickness (10$^{-3}$ inches) | 16 | 16 | 16 | 16 | 16 | 16 | 16 |
| CFA | 0.401 | 0.401 | 0.401 | 0.401 | 0.401 | 0.401 | 0.401 |
| % Porosity | | 48.3199 | 49.256 | | 47.9688 | 47.4754 | |
| d1 (um) | | 9.60 | 4.57 | | 7.57 | 6.93 | |
| d2 (um) | | 10.63 | 7.95 | | 9.02 | 8.42 | |
| d5 (um) | | 11.85 | 10.88 | | 10.22 | 9.85 | |
| d10 (um) | | 13.02 | 12.39 | | 11.21 | 10.99 | |
| d25 (um) | | 15.36 | 15.22 | | 13.10 | 13.07 | |
| d50 (um) | | 18.80 | 19.55 | | 16.06 | 16.10 | |
| d75 (um) | | 23.93 | 26.13 | | 20.51 | 21.03 | |
| d90 (um) | | 38.28 | 42.01 | | 32.40 | 34.55 | |
| d95 (um) | | 61.47 | 61.04 | | 51.52 | 53.86 | |
| d98 (um) | | 110.25 | 99.63 | | 93.28 | 93.21 | |
| d99 (um) | | 157.44 | 140.41 | | 140.17 | 140.52 | |
| (d50 − d10)/d50 | | 0.31 | 0.37 | | 0.30 | 0.32 | |
| (d90 − d10)/d50 | | 1.34 | 1.52 | | 1.32 | 1.46 | |
| CTE$^{25-800°}$ C. (10$^{-7}$ K$^{-1}$) | 8.2 | 15.9 | 5.7 | 8.1 | 6.3 | 3.1 | 6.8 |
| CTE$^{500-800°}$ C. (10$^{-7}$ K−1) | 15 | 13.7 | 12.2 | 15 | 13.5 | 13.2 | 17 |
| MOR$^{25° C.}$ (psi) | | 1316 | 370 | 513 | 441 | 402 | |
| $\sigma_{wall}^{25° C.}$ (psi) | | 2875 | 808 | 1121 | 964 | 878 | |
| $E_{mc}^{25° C.}$ (10$^5$ psi) | 10.9 | 15.8 | 7.48 | 7.47 | 8.17 | 7.14 | 7.49 |
| $E^{800° C.}$ (10$^5$ psi) | 18.9 | 16.3 | 14.5 | 14.3 | 15.6 | 15.2 | 15.5 |
| $E^{1000° C.}$ (10$^5$ psi) | 18.3 | 15.4 | 13.7 | 13.5 | 16.2 | 15.8 | 16.3 |
| $E_{nmc}^{25° C.}$ (10$^5$ psi) | 19.76 | 17.59 | 15.65 | 15.45 | 14.74 | 14.34 | 14.35 |
| MCP = $E_{nmc}^{25° C.}/E_{mc}^{25° C.}$ | 1.81 | 1.11 | 2.09 | 2.07 | 1.80 | 2.01 | 1.92 |
| ST = ($\sigma_{wall}^{25° C.}$ CFA/($E_{mc}^{25° C.}$)) in % | | 0.073 | 0.043 | 0.060 | 0.047 | 0.049 | |
| TS = 500 + ST/CTE$^{500-800°}$ C. | | 1033 | 855 | 901 | 850 | 874 | |

EXAMPLE 2

Type B Cordierite with Additives

Type B cordierite batches with various additives, as shown in Table 2, were fired and annealed; properties were determined. Type B cordierite with addition of yttria showed again the peculiar behavior that in an initial firing non-microcracked cordierite is obtained and only during annealing at temperatures higher than 1000° C. the crystallization of $Y_2Si_2O_7$ leads to microcracking, see elastic modulus and CTE curves in FIGS. 10 and 11. The hysteresis of the E-modulus during heating and cooling reflects a significant change between annealing at 1000° C. and 1100° C., which is related to the microcracking of the prior non-microcracked ceramic. During the initial firing, a non-microcracked ceramic with glassy Y-silicate pockets is obtained. Annealing for several hours at >1000° C. induces the crystallization of the glass and due to the associated change in volume also induces microcracking. Thus, a non-microcracked initial ceramic transforms into a microcracked ceramic. The CTE curves taking after similar annealing conditions confirm that behavior.

CTE can be optimized by the annealing temperature. For most studied additives, an optimum was achieved for annealing at 1100 or 1200° C. The observed decrease in CTE is significant, see FIG. 12. Lowest CTE of $1 \times 10^{-7}$ K$^{-1}$ was achieved by addition of 3% yttria and annealing at 1100° C.

The Type B materials all show very similar porosity, 50%, narrow d-factor, and have an average pore size of 20 and more micrometer, see Table 4.

TABLE 4 summary of pore network characteristics in the different Type B materials obtained with large size talc and potato starch.

| Super-Additive | porosity in % | d50 in μm | (d50 − d10)/d50 | CTE$^{25\_800C}$ in 10$^{-7}$ K$^{-1}$ after firing at 1420 C. | CTE$^{25\_800C}$ in 10$^{-7}$ K$^{-1}$ after annealing at 1000 C. | CTE$^{25\_800C}$ in 10$^{-7}$ K$^{-1}$ after annealing at 1100 C. | CTE$^{25\_800C}$ in 10$^{-7}$ K$^{-1}$ after annealing at 1200 C. | CTE$^{25\_800C}$ in 10$^{-7}$ K$^{-1}$ after annealing at 1300 C. |
|---|---|---|---|---|---|---|---|---|
| 1% $Y_2O_3$ + 2% $SiO_2$ | 49 | 25 | 0.22 | 12..9 | | | | |
| 1% $Y_2O_3$ + 2% $Al_2O_3$ | 49 | 25 | 0.22 | 14.6 | | | 9.7 | |
| 3% $La_2O_3$ | 51 | 30 | 0.20 | 10.0 | 8.1 | 8.7 | 6 | 8.2 |
| 3% $Y_2O_3$ | 50 | 43 | 0.21 | 9.7 | 3.3 | 2.8 | 5 | 6.8 |
| 1% $Fe_2O_3$ + 2% $TiO_2$ | 52 | 29 | | | | | | |
| 3% $ZrO_2$ | 55 | 30 | 0.32 | 9.9 | | | 6.7 | |

Material microstructures illustrate interactions between microcracks and precipitate dispersion. Non-toughened Type A ceramic shows a typical microcrack pattern with large, long, straight cracks. An example is shown in FIG. 13. Even though this was due to lack in statistics not confirmed in the SEM images, those cracks grow in average during thermal cycling. In the materials with additives can be seen that cracks go straight through the glassy pockets in the materials that have undergone only the initial firing and no further crystallization.

In dispersion toughened ceramics, after the annealing, strong interaction between cracks and precipitates is noticed. The strongest interaction was seen in materials containing titania addition. In that material, as illustrated in FIG. 14, crack paths are more tortuous, show penetration along the precipitate interfaces and extensive crack branching.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A porous ceramic honeycomb comprising a first phase of microcracked cordierite ceramic and a second phase of crystalline non-cordierite metal oxide particles dispersed in the cordierite ceramic, wherein at least a portion of the interface between the first and second phases is wetted by glass and the second phase particles have a size in the range of from about 0.01 to about 10 μm.

2. The product of claim 1, wherein the second phase particles have a size in the range of from about 0.03 to about 3 μm.

3. The product of claim 1, wherein the second phase particles have a size in the range of from about 0.05 to about 1 μm.

4. The product of claim 1, wherein the second phase is selected from the group consisting essentially of $(RE)_2Si_2O_7$ and a titanate containing at least one of a transitional metal, an alkaline earth element, aluminum, silicon, zircon, mixed oxides and mixed silicates, wherein RE is a rare earth metal.

5. The product of claim 4, wherein the titanate contains at least one of Al, Mg, Fe, Ni, Co, and Mn.

6. The product of claim 4, wherein RE is Y, Yb, Sm, Er, La, or Lu.

7. The product of claim 1, wherein the second phase is present in an amount from about 0.2 to about 20 wt. % of the honeycomb material.

8. The product of claim 1, wherein the second phase is present in an amount from about 0.5 to about 5 wt. %.

9. The product of claim 1, wherein the second phase is present in an amount from about 1 to about 3 wt. % of the honeycomb material.

10. The product of claim 1, wherein the interfacial glass layer between the cordierite and second phase comprises a layer thickness in the range from about 0.3 nm to about 0.3 μm.

11. The product of claim 1, wherein the cordierite material has a microcrack parameter of MCP=1.2 to MCP=2.1.

12. The product of claim 1, wherein ceramic honeycomb has a porosity of at least about 45%.

13. The product of claim 1, wherein the ceramic honeycomb has a median pore size in the range from about 10 to about 20 μm and a pore size distribution with (d50−d10)/d50 the range from about 0.3 to about 0.5.

14. A method for toughening a porous microcracked cordierite honeycomb comprising the steps of:

providing a cordierite batch composition;

adding to the cordierite batch composition at least one non-cordierite forming metal oxide or metal oxide precursor;

mixing the batch composition with a pore former, binder, and water into a paste;

shaping the paste into a green body;

firing the green body; and annealing the fired green body at a temperature below the firing temperature to form a toughened cordierite ceramic honeycomb having a second phase of crystallized non-cordierite particles dispersed within the cordierite ceramic, wherein at least a portion of the interface between the first and second phases is wetted by glass.

15. The method of claim 14, wherein the annealing step comprises cooling the fired green body to a temperature below the annealing temperature and then heating the green body to the annealing temperature to crystallize the non-cordierite second phase particles.

16. The method of claim 14, wherein the annealing step comprises cooling the fired green body to the annealing temperature to crystallize the non-cordierite second phase particles.

17. The method of claim 14, wherein the batching comprises adding the at least one non-cordierite forming metal oxide or metal oxide precursor as dissolved salts, gel or suspension to the batch.

18. The method of claim 14, wherein the firing comprises a maximum temperature of from about 1350° C. to about 1430° C. with hold.

19. The method of claim 14, wherein the annealing comprises a temperature in the range from about 900° C. to about 1250° C. for at least 1h.

20. The method of claim 15, wherein the second phase particles comprise additives compatible with cordierite, that are glass-forming with cordierite constituents at temperatures between about 1200° C. and about 1430° C. and then crystallize into dispersed precipitates.

* * * * *